(12) United States Patent
Han et al.

(10) Patent No.: US 11,042,728 B2
(45) Date of Patent: *Jun. 22, 2021

(54) ELECTRONIC APPARATUS FOR RECOGNITION OF A USER AND OPERATION METHOD THEREOF

(71) Applicant: Samsung Electronics Co., Ltd., Suwon-si (KR)

(72) Inventors: Heung-Woo Han, Seoul (KR); Seong-Min Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,816

(22) Filed: Jan. 2, 2020

(65) Prior Publication Data

US 2020/0143149 A1     May 7, 2020

Related U.S. Application Data

(63) Continuation of application No. 15/850,393, filed on Dec. 21, 2017, now Pat. No. 10,528,799.

(30) Foreign Application Priority Data

Dec. 23, 2016  (KR) .................. 10-2016-0177884
Oct. 19, 2017  (KR) .................. 10-2017-0135870

(51) Int. Cl.
*G06K 9/00*     (2006.01)
*G06K 9/62*     (2006.01)

(52) U.S. Cl.
CPC ..... *G06K 9/00288* (2013.01); *G06K 9/00228* (2013.01); *G06K 9/00268* (2013.01);
(Continued)

(58) Field of Classification Search
CPC ........... G06K 9/00288; G06K 9/00228; G06K 9/00268; G06K 9/00255; G06K 9/6262;
(Continued)

(56) References Cited

U.S. PATENT DOCUMENTS

| | | | |
|---|---|---|---|
| 5,497,430 A * | 3/1996 | Sadovnik ........... | G06K 9/00221 382/118 |
| 6,389,181 B2 * | 5/2002 | Shaffer ............. | H04N 1/00132 358/403 |

(Continued)

FOREIGN PATENT DOCUMENTS

| | | |
|---|---|---|
| KR | 10-2014-0012295 A | 2/2014 |
| KR | 10-2015-0024162 A | 3/2015 |

(Continued)

OTHER PUBLICATIONS

European Search Report dated Oct. 25, 2019; European Appln. No. 17884746.3-1207 / 3539056 PCT/KR2017015279.

(Continued)

*Primary Examiner* — Amir Alavi
(74) *Attorney, Agent, or Firm* — Jefferson IP Law, LLP

(57) ABSTRACT

An electronic apparatus is provided. The electronic apparatus includes a camera configured to obtain a user image by capturing an image of a user, a memory configured to store one or more instructions, and a processor configured to execute the one or more instructions stored in the memory, wherein the processor is further configured to, by executing the one or more instructions, recognize the user from a face region of the user image by using a first recognition model learned based on face information of a plurality of users, extract additional feature information regarding the recognized user from the user image, allow the first recognition model to additionally learn based on the extracted additional feature information, recognize the user from a person region of the user image by using an additionally learned second (Continued)

recognition model, and output a recognition result of the second recognition model.

21 Claims, 14 Drawing Sheets

(52) U.S. Cl.
CPC ......... *G06K 9/00335* (2013.01); *G06K 9/627* (2013.01); *G06K 9/6262* (2013.01); *G06K 9/00255* (2013.01)

(58) Field of Classification Search
CPC ............... G06K 9/00335; G06K 9/627; G06K 9/00222; G06K 9/00287; G06K 9/00281; G06K 9/00248; G06K 9/202; G06K 9/222; G06K 9/2011; G06K 9/72; G06K 9/0083; G06K 9/4609; G06T 2207/10016; G11B 27/28
See application file for complete search history.

(56) References Cited

U.S. PATENT DOCUMENTS

| | | | | |
|---|---|---|---|---|
| 6,671,391 | B1 * | 12/2003 | Zhang | G06K 9/00228 382/118 |
| 7,848,544 | B2 * | 12/2010 | Mariani | G06K 9/00288 382/118 |
| 7,936,906 | B2 * | 5/2011 | Hua | G06K 9/6232 382/118 |
| 8,295,544 | B2 * | 10/2012 | Fukuda | H04N 5/23219 382/103 |
| 8,306,282 | B2 * | 11/2012 | Chou | G06K 9/00221 382/118 |
| 8,379,917 | B2 * | 2/2013 | Bigioi | G06K 9/00295 382/103 |
| 8,457,389 | B2 * | 6/2013 | Ishiyama | G06K 9/4661 382/154 |
| 8,599,266 | B2 * | 12/2013 | Trivedi | H04N 5/2259 348/169 |
| 9,025,023 | B2 | 5/2015 | Park et al. | |
| 9,323,979 | B2 * | 4/2016 | Bigioi | G06K 9/00295 |
| 9,367,730 | B2 | 6/2016 | Irmatov et al. | |
| 9,928,647 | B2 | 3/2018 | Hwang et al. | |
| 10,528,799 | B2 * | 1/2020 | Han | G06K 9/00335 |
| 2004/0034611 | A1 | 2/2004 | Kee et al. | |
| 2009/0185723 | A1 | 7/2009 | Kurtz et al. | |
| 2011/0293188 | A1 | 12/2011 | Zhang et al. | |
| 2012/0213422 | A1 | 8/2012 | Niskanen et al. | |
| 2017/0036115 | A1 | 2/2017 | Barajas Gonzalez et al. | |
| 2017/0244556 | A1 | 8/2017 | Wold et al. | |
| 2018/0095540 | A1 | 4/2018 | Terao et al. | |
| 2018/0107660 | A1 | 4/2018 | Wang et al. | |
| 2018/0181797 | A1 | 6/2018 | Han et al. | |
| 2020/0009739 | A1 * | 1/2020 | Moon | G06N 3/08 |

FOREIGN PATENT DOCUMENTS

| | | |
|---|---|---|
| KR | 10-2015-0127381 A | 11/2015 |
| KR | 10-1629324 B1 | 6/2016 |

OTHER PUBLICATIONS

European Office Action dated Apr. 28, 2021, issued in European Application No. 17884746.3.

Indian office Action dated Feb. 26, 2021, issued in Indian Application No. 201917024370.

* cited by examiner

FIG. 4
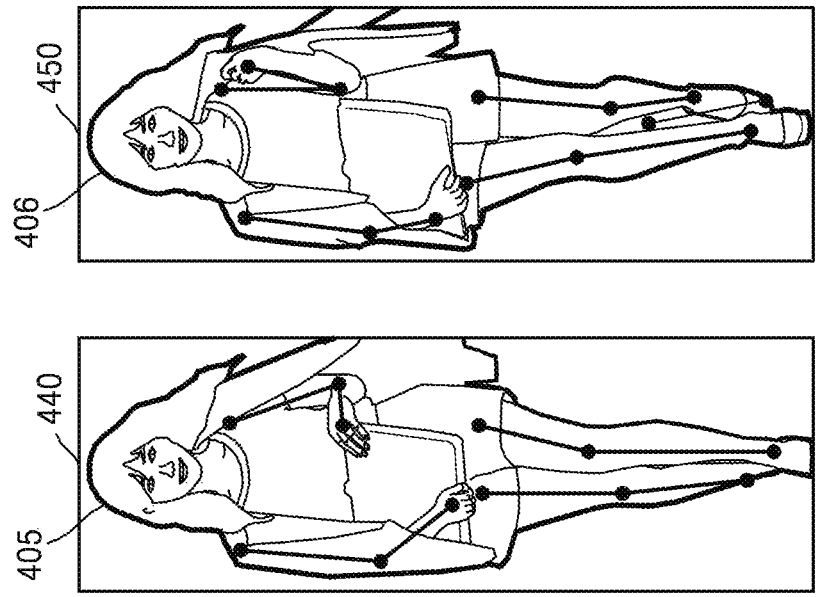
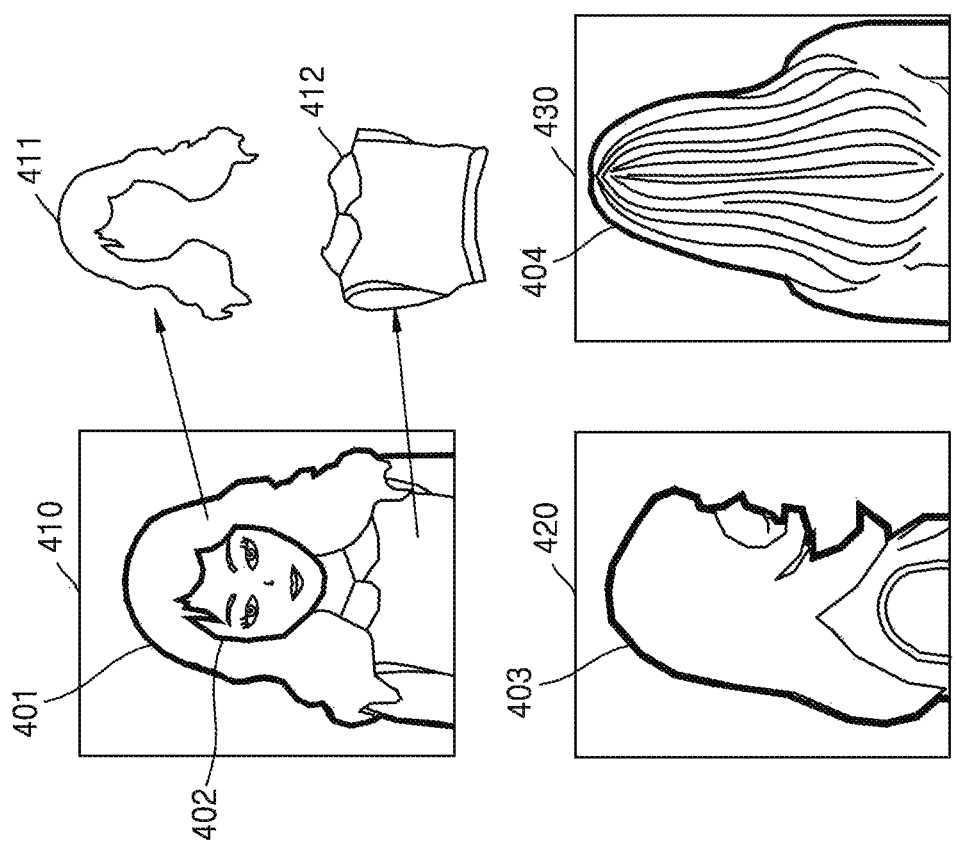

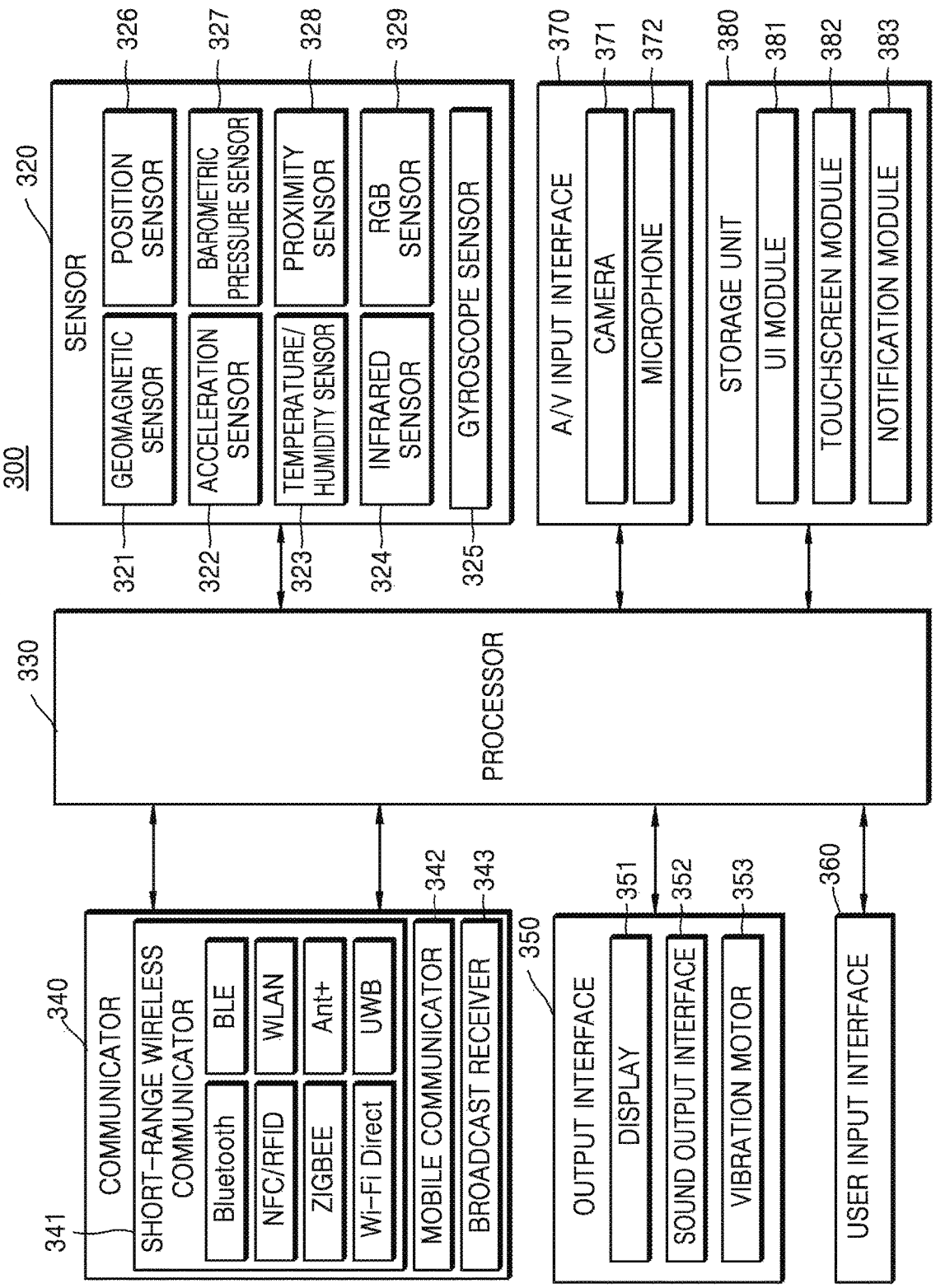

ELECTRONIC APPARATUS FOR RECOGNITION OF A USER AND OPERATION METHOD THEREOF

CROSS-REFERENCE TO RELATED APPLICATION(S)

This application is a continuation application of prior application Ser. No. 15/850,393, filed on Dec. 21, 2017, which claimed the benefit under 35 U.S.C. § 119(a) of a Korean patent application filed on Dec. 23, 2016 in the Korean Intellectual Property Office and assigned Serial number 10-2016-0177884, and of a Korean patent application filed on Oct. 19, 2017 in the Korean Intellectual Property Office and assigned Serial number 10-2017-0135870, the entire disclosure each of which is hereby incorporated by reference.

TECHNICAL FIELD

The present disclosure relates to electronic apparatuses and operation methods thereof. More particularly, the present disclosure relates to electronic apparatuses capable of recognizing a user based on a user image, and operation methods of the electronic apparatuses.

In addition, the present disclosure relates to an artificial intelligence (AI) system for mimicking functions of a human brain, such as cognition and judgment, by using a machine learning algorithm, and application of the AI system.

BACKGROUND

Facial recognition technology means technology for extracting, from a user's face, various information such as a length or a distance of each organ, such as eyes, nose, and mouth, included in the face, and recognizing the user by analyzing the extracted information.

Facial recognition technology may be used for identification purposes instead of an identification card, a passport, a credit card, etc., and may also be used for security purposes such as commuter management, door pass control, and password replacement. In addition, facial recognition technology may be used for public order purposes such as searching for a criminal suspect and surveillance of a crime-ridden district.

User recognition using facial recognition technology involves recognizing a user based on features extracted from a face region of a user image and thus has a problem in that, when a front of the face is not included in the user image, or a user's face appears small because an image of the user is captured from a distance, it is difficult to recognize the face.

In addition, an artificial intelligence (AI) system that implements human-level intelligence has been recently used in the field of facial recognition. Unlike an existing rule-based smart system, the AI system allows a machine to learn by itself, make decisions, and become smarter. As the AI system is used, the AI system has an improved recognition rate and accurately understands a user's preference, and thus, the existing rule-based smart system is gradually being replaced with a deep-learning-based AI system.

AI technology includes machine learning (e.g., deep learning) and element technologies using machine learning. Machine learning is an algorithm technique that classifies/learns characteristics of input data by itself, and element technologies are technologies that simulate a function such as recognition, decision making, etc., of a human brain by using a machine-learning algorithm such as deep learning, and include technical fields such as linguistic understanding, visual understanding, inference/prediction, knowledge representation, operation control, and so forth.

The AI technology is employed in various fields. For example, linguistic understanding is a technique that recognizes, and applies/processes human languages/texts, and includes natural language processing, machine interpretation, a conversation system, question and answer processing, voice recognition/synthesis, and so forth. Visual understanding is a technique that recognizes and processes an object in the same manner as a human visual system, and includes object recognition, object tracking, image searching, people recognition, scene understanding, space understanding, image enhancement, etc. Inference/prediction is a technique that determines information and performs logical inference and prediction based thereon, and includes knowledge/probability-based inference, optimization prediction, preference-based planning/recommendation, and so forth. Knowledge representation is a technique that automatizes human experience information as knowledge data, and includes knowledge establishment (data creation/classification), knowledge management (data utilization), and the like. Operation control is a technique that controls autonomous driving of a vehicle and motion of a robot, and includes motion control (navigation, collision, driving), manipulation control (action control), and so forth.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide electronic apparatuses capable of recognizing a user by using appearance information or behavior information of a user in addition to face information of the user, and operation methods of the electronic apparatuses.

Additional aspects will be set forth in part in the description which follows and, in part, will be apparent from the description, or may be learned by practice of the presented embodiments.

In accordance with an aspect of the present disclosure, an electronic apparatus is provided. The apparatus includes a camera configured to obtain a user image by capturing an image of a user, a memory configured to store one or more instructions, and a processor configured to execute the one or more instructions stored in the memory, wherein the processor is further configured to, by executing the one or more instructions, recognize the user from a face region of the user image by using a first recognition model learned based on face information of a plurality of users, extract additional feature information regarding the recognized user from the user image, allow the first recognition model to additionally learn based on the extracted additional feature information, recognize the user from a person region of the user image by using an additionally learned second recognition model, and output a recognition result of the second recognition model.

In accordance with another aspect of the present disclosure, an operation method of an electronic apparatus is provided. The method includes obtaining a user image by capturing an image of a user, recognizing the user from a face region of the user image by using a first recognition model learned based on face information of a plurality of users, extracting additional feature information regarding the recognized user from the user image, allowing the first recognition model to additionally learn based on the extracted additional feature information of the user, recognizing the user from a person region of the user image by using an additionally learned second recognition model, and outputting a recognition result of at least one of the second recognition model.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

These above and other aspects, features, and advantages of certain embodiments of the present disclosure will be more apparent from the following description taken in conjunction with the accompanying drawings, in which:

FIG. 4 is a diagram for explaining a method of extracting additional feature information, according to an embodiment of the present disclosure;

FIG. 15 is a block diagram of a structure of an electronic apparatus, according to an embodiment of the present disclosure.

Throughout the drawings, like reference numerals will be understood to refer to like parts, components, and structures.

DETAILED DESCRIPTION

Figure 1:
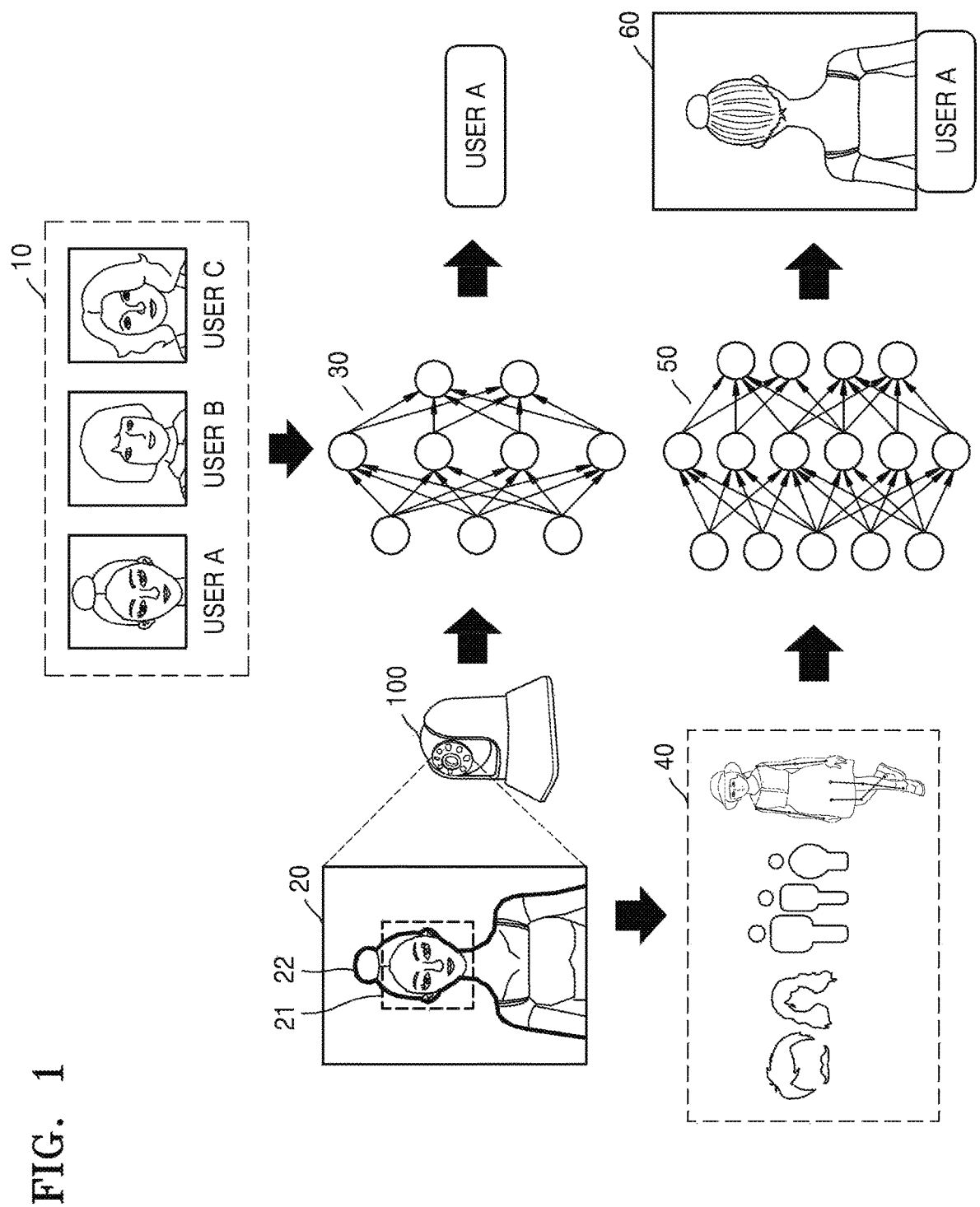
FIG. 1 is a diagram of a method, performed by an electronic apparatus, of recognizing a user, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the present specification will be briefly described, and the present disclosure will be described in detail. As used herein, the term "and/or" includes any and all combinations of one or more of the associated listed items. Expressions such as "at least one of," when preceding a list of elements, modify the entire list of elements and do not modify the individual elements of the list.

The terms used in the present disclosure are selected from among common terms that are currently widely used in consideration of their function in the present disclosure. However, the terms may be different according to an intention of one of ordinary skill in the art, a precedent, or the advent of new technology. In addition, in particular cases, the terms are discretionally selected by the applicant, and the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the present application, when a part "includes" an element, it is to be understood that the part additionally includes other elements rather than excluding other elements as long as there is no particular opposing recitation. In addition, the terms such as " . . . unit", "-or", "module", or the like used in the present application indicate a unit which processes at least one function or motion, and the unit may be implemented as hardware or software or by a combination of hardware and software.

Embodiments will now be described more fully with reference to the accompanying drawings so that those of ordinary skill in the art may practice the embodiments without any difficulty. However, the present embodiments may have different forms and should not be construed as being limited to the descriptions set forth herein. In addition, parts in the drawings unrelated to the detailed description are omitted to ensure clarity of the present disclosure, and like reference numerals in the drawings denote like elements throughout.

FIG. 1 is a diagram of a method, performed by an electronic apparatus 100, of recognizing a user, according to an embodiment of the present disclosure.

Referring to FIG. 1, the electronic apparatus 100 may have various forms. For example, the electronic apparatus 100 may be implemented as various kinds of electronic apparatuses, such as a closed circuit television (CCTV), a video phone, a camera, a smart door lock, a cellular phone, a smartphone, a laptop computer, a desktop, a tablet personal computer (PC), an e-book reader, a digital broadcasting terminal, a personal digital assistant (PDA), a portable multimedia player (PMP), a navigation apparatus, a MP3 player, a camcorder, an Internet protocol television (IPTV), a digital television (DTV), a wearable device (for example, a smart glass, etc.), etc. However, the present disclosure is not limited thereto. In addition, although FIG. 1 shows the electronic apparatus 100 that obtains a user image 20 by capturing an image of a user, the present disclosure is not limited thereto, and the electronic apparatus 100 according to an embodiment may receive a user image captured in an external camera apparatus.

The term "user" in embodiments of the present specification may refer to a person who controls a function or an operation of an electronic apparatus and may include a manager or an installer. Alternatively, the user may refer to a person recognized by an electronic apparatus.

The electronic apparatus 100 may register face information regarding a plurality of users. For example, the electronic apparatus 100 may obtain user images 10 regarding a plurality of users intended to be registered. The user images 10 may include an image captured by using an electronic apparatus, an image stored in an electronic apparatus, or an image received from an external apparatus. In addition, the user images 10 may be images where face regions may be detected, and for example, may be images including front face parts of users (user A, user B, and user C).

The electronic apparatus 100 may extract face information from the user images 10 by using a first recognition model 30 and may allow the first recognition model 30 to learn by using the extracted face information. The first recognition model 30 may be a model of recognizing a user based on face information. In addition, the first recognition model 30 may be a model based on neural network. For example, a model such as deep neural network (DNN), recurrent neural network (RNN), or bidirectional recurrent deep neural network (BRDNN) may be used as the first recognition model 30, but the present disclosure is not limited thereto.

The electronic apparatus 100 may obtain the user image 20 by capturing an image of a user intended to be recognized. However, the present disclosure is not limited thereto. The electronic apparatus 100 may detect a face region 21 from the user image 20 by using the first recognition model 30, may extract face information of the user from the detected face region 21, and may recognize which one of the registered users is the user based on the extracted face information.

In addition, the electronic apparatus 100 may detect a person region 22 from the user image 20. The electronic apparatus 100 may extract additional feature information 40 such as appearance information or behavior information of the user from the person region 22. For example, the electronic apparatus 100 may extract the additional feature information 40 such as appearance information or behavior information of the user by using a feature extraction model, but the present disclosure is not limited thereto.

When user A is recognized in the user image 20 based on face information, the electronic apparatus 100 may match the extracted additional feature information 40 with user A to generate a second recognition model 50 with the first recognition model 30 having additionally learned. The second recognition model 50 according to an embodiment may be a model of recognizing a user based on the additional feature information 40 in addition to the face information. In addition, the second recognition model 50 may be a model based on neural network. For example, a model such as DNN, RNN, or BRDNN may be used as the second recognition model 50, but the present disclosure is not limited thereto.

In a case of using the second recognition model 50, even when the electronic apparatus 100 obtains a user image 60 where a face region is not detected, the electronic apparatus 100 may extract additional feature information from the user image 60 and may recognize user A based on the extracted additional feature information.

The electronic apparatus 100 may determine whether it is necessary to update an existing second recognition model, based on a user recognition result through the second recognition model. When it is determined that the second recognition model is necessary to update, the second recognition model may be allowed to additionally learn by using user data. The user data may include a user image and user information mapped to the user image, or additional feature information extracted from a user image and user information mapped to the additional feature information. However, the present disclosure is not limited thereto.

Figure 2:
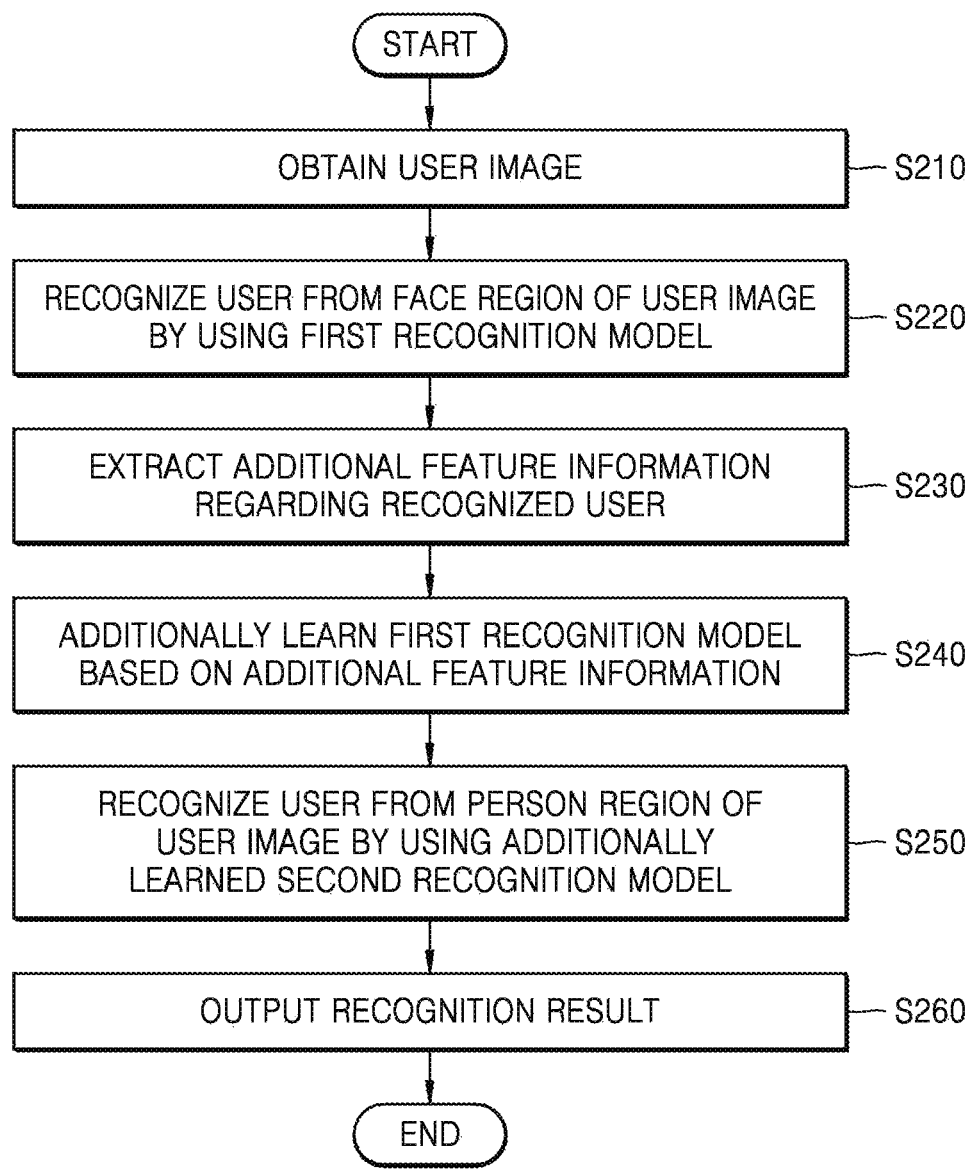
FIG. 2 is a flowchart of an operation method of an electronic apparatus, according to an embodiment of the present disclosure.

FIG. 2 is a flowchart of an operation method of an electronic apparatus, according to an embodiment of the present disclosure.

Referring to FIG. 2, in operation S210, the electronic apparatus 100 may obtain a user image intended to be recognized. For example, the user image may include an image captured in the electronic apparatus 100, an image stored in the electronic apparatus 100, or an image received from an external apparatus. However, the present disclosure is not limited thereto.

In operation S220, the electronic apparatus 100 may recognize a user from a face region of the user image by using a first recognition model. The first recognition model may be a model learned by using face information regarding a plurality of registered users, and may be a model of recognizing a user based on face information. For example, the electronic apparatus 100 may detect a face region in a user image, may extract face information of a user from the detected face region, and may recognize which one of the registered users is the user based on the extracted face information. A method of recognizing a user based on face information is described below in detail with reference to FIG. 3.

In operation S230, the electronic apparatus 100 may extract additional feature information regarding the recognized user. For example, the electronic apparatus 100 may extract additional feature information from the user image obtained in operation S210. The electronic apparatus 100 may detect a person region in the user image and may extract additional feature information including appearance information or behavior information of the user from the detected person region. A method of extracting additional feature information is described in detail below with reference to FIG. 4.

Alternatively, the electronic apparatus 100 may obtain user images regarding the user recognized in operation S220 in real time and may extract additional feature information from the images obtained in real time.

In operation S240, the electronic apparatus 100 may allow the first recognition model to additionally learn based on the additional feature information. For example, the electronic apparatus 100 may allow the first recognition model to additionally learn by matching additional feature information extracted with respect to user A with user A and thus may generate a second recognition model. The second recognition model may be a model of recognizing a user based on additional feature information in addition to face information of the user.

In operation S250, the electronic apparatus 100 may recognize a user from a person region of the user image by using an additionally learned second recognition model. For example, even when the electronic apparatus 100 obtains a user image where a face region is not detected, the electronic apparatus 100 may extract additional feature information from a person region of the user image, and may recognize a user based on the extracted additional feature information.

In operation S260, the electronic apparatus 100 may output a recognition result. For example, as a result of recognizing a user, the electronic apparatus 100 may display the recognized user, or may generate an alarm or output a warning message when the recognized user is not a fair user. However, the present disclosure is not limited thereto.

Figure 3:
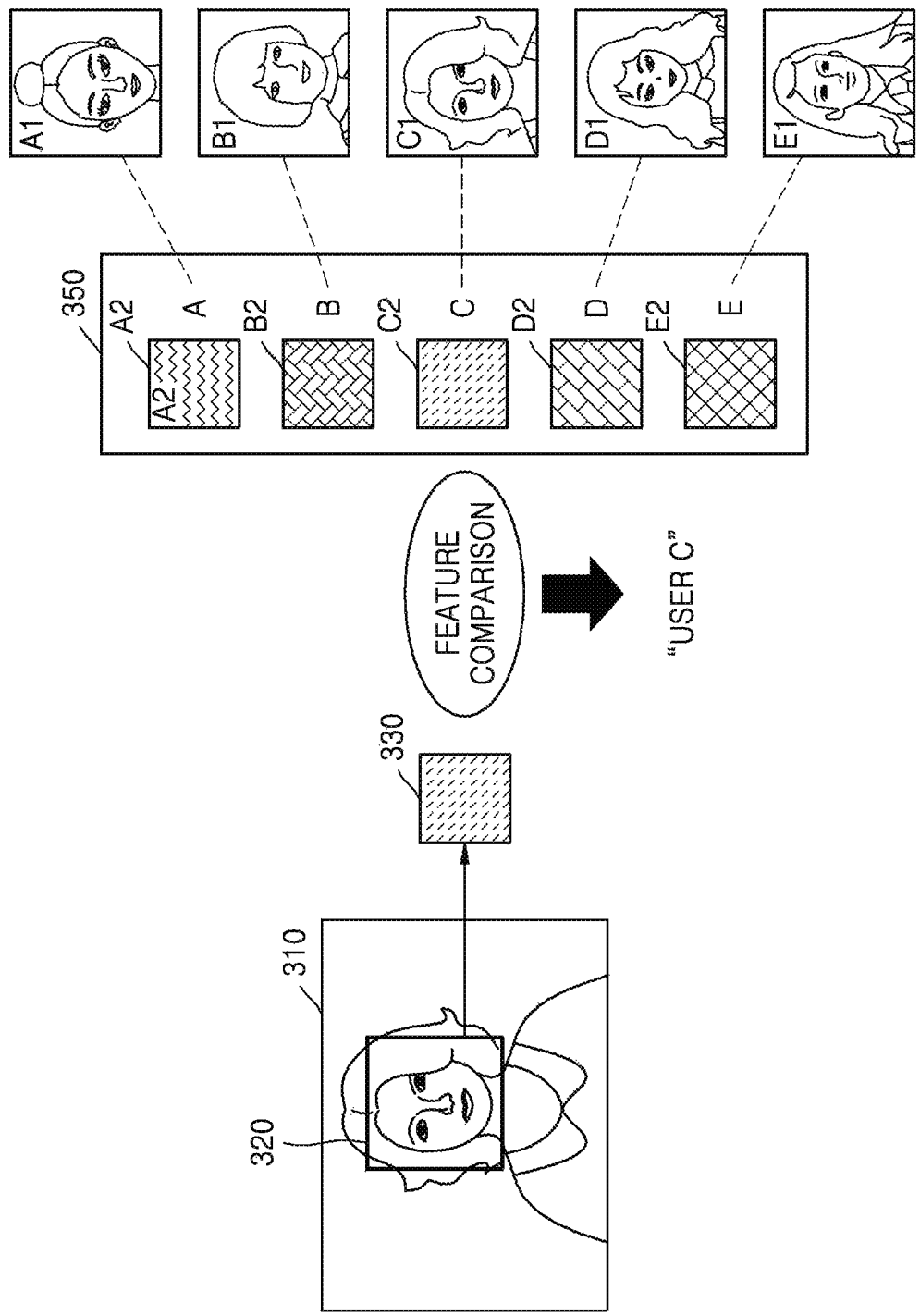
FIG. 3 is a diagram for explaining a method of recognizing a user by using face information, according to an embodiment of the present disclosure.

FIG. 3 is a diagram of a method of recognizing a user by using face information, according to an embodiment of the present disclosure.

Referring to FIG. 3, the electronic apparatus 100 may recognize a user by using face information. For example, the electronic apparatus 100 may register face information regarding a plurality of users. The electronic apparatus 100 may extract face information from each of images A1 to A5 regarding the plurality of users by using a first recognition model or a second recognition model. Face information extracted from the image A1 of user A may be denoted by A2, face information extracted from the image B1 of user B may be denoted by B2, face information extracted from the image C1 of user C may be denoted by C2, face information extracted from the image D1 of user D may be denoted by D2, and face information extracted from the image E1 of user E may be denoted by E2. The face information A2 to E2 may be represented as a feature matrix, a feature vector, a number, etc., but the present disclosure is not limited thereto.

The electronic apparatus 100 may store the extracted face information matched with each user in a database 350.

The electronic apparatus 100 may obtain a user image 310 intended to be recognized. The electronic apparatus 100 may detect a face region 320 from the user image 310. Extraction of a face region refers to extraction of location information regarding a user's face from the user image 310, and may be performed by using various prior algorithms (e.g., a Viola-Jones algorithm, a deep-learning-based algorithm, etc.). The electronic apparatus 100 may divide the user image 310 into a plurality of pixel block units, may calculate a representative pixel value for each pixel block, and may detect the face region 320 based on the calculated representative pixel value and a location of each pixel block. However, the present disclosure is not limited thereto.

When the face region 320 is detected, the electronic apparatus 100 may extract face information from the face region 320. Extraction of face information may be performed by using various prior algorithms (e.g., a template matching technique, a deep-learning-based algorithm, etc.). For example, the electronic apparatus 100 may extract feature parameters indicating facial features from the face region 320 and determine face information based on the feature parameters. The electronic apparatus 100 may extract various feature parameters such as a face shape or size, a face length, a face width, a distance between eyebrows, a nose bridge length, a lip tail angle, a lip length, an eye size, an eye location, an eye tail angle, a nose size, an ear location, an eyebrow thickness, an eyebrow location, an eyebrow length, etc. However, the present disclosure is not limited thereto.

Referring to FIG. 3, the electronic apparatus 100 may extract face information 330 from the face region 320 of the user image 310.

The electronic apparatus 100 may compare the face information 330 extracted from the user image 310 with face information registered in a database and determine a user corresponding to the face information 330. For example, the electronic apparatus 100 may recognize a user corresponding to the user image 310 as user C when it is determined that the face information 330 and the face information C2 registered in the database 350 are in the same or similar range.

FIG. 4 is a diagram of a method of extracting additional feature information, according to an embodiment of the present disclosure.

Referring to FIG. 4, the electronic apparatus 100 may detect a person region in a user image and may extract additional feature information from the person region. In addition, additional feature information may include appearance information and behavior information of a user. The appearance information of the user may include a body shape, a hairstyle, a hair color, whether to wear glasses, a clothing style, and a side or front view of the user. In addition, the behavior information of the user may include a gait and a behavior habit of the user. However, the present disclosure is not limited thereto.

Referring to FIG. 4, the electronic apparatus 100 may detect a person region 401 in a first user image 410. For example, the electronic apparatus 100 may detect a face region 402, may detect a boundary line of the person region 401 based on the detected face region 402, and may detect the person region 401 according to the detected boundary line. Alternatively, a partial body region other than the face region 402 may be detected, and the person region 401 may be detected based on the detected partial body region. However, the present disclosure is not limited thereto, and the person region 401 may be detected by using various prior algorithms (for example, a human detection technique, etc.).

In addition, when the person region 401 is detected, the electronic apparatus 100 may divide the person region 401 into regions for body parts. For example, the electronic apparatus 100 may divide an entire region of the user into partial regions such as a head region, an arm region, a leg region, a face region, and a trunk region of the user. The electronic apparatus 100 may extract additional feature information from the regions for body parts.

For example, information such as a hairstyle 411 (e.g., a hair length, whether hair is wavy or not, whether to wear bangs, etc.), a hair color, and a hair accessory may be extracted from the head region of the user. Alternatively, information such as whether to wear glasses, a facial hair shape, and a facial hair location may be extracted from the face region of the user. Alternatively, a clothing style 412, body shape information, etc. may be extracted from the arm or trunk region of the user.

The electronic apparatus 100 may also detect person regions 403 and 404 in a second user image 420 including a side view of the user or a third user image 430 including a rear view of the user and may extract side view information or rear view information of the user from the detected person regions 403 and 404.

The electronic apparatus 100 may also detect person regions 405 and 406 in a fourth user image 440 or a fifth user image 450 including the user's whole body and may extract information such as a body shape and a body proportion of the user from the detected person regions 405 and 406. Information such as a gait and a behavior habit of the user may be extracted based on the images 440 and 450 regarding the user's whole body which are obtained in real time.

Based on additional feature information extracted from the user image, the electronic apparatus 100 may allow a first recognition model or a second recognition model to additionally learn and thus may update the first recognition model or the second recognition model.

In addition, the electronic apparatus 100 may match the additional feature information extracted from the user image with the user and store the matched additional feature information in a database. When a user image is obtained, a user corresponding to additional feature information extracted from the obtained user image may be determined by comparing the additional feature information extracted from the obtained user image with the additional feature information stored in the database.

Figure 5:
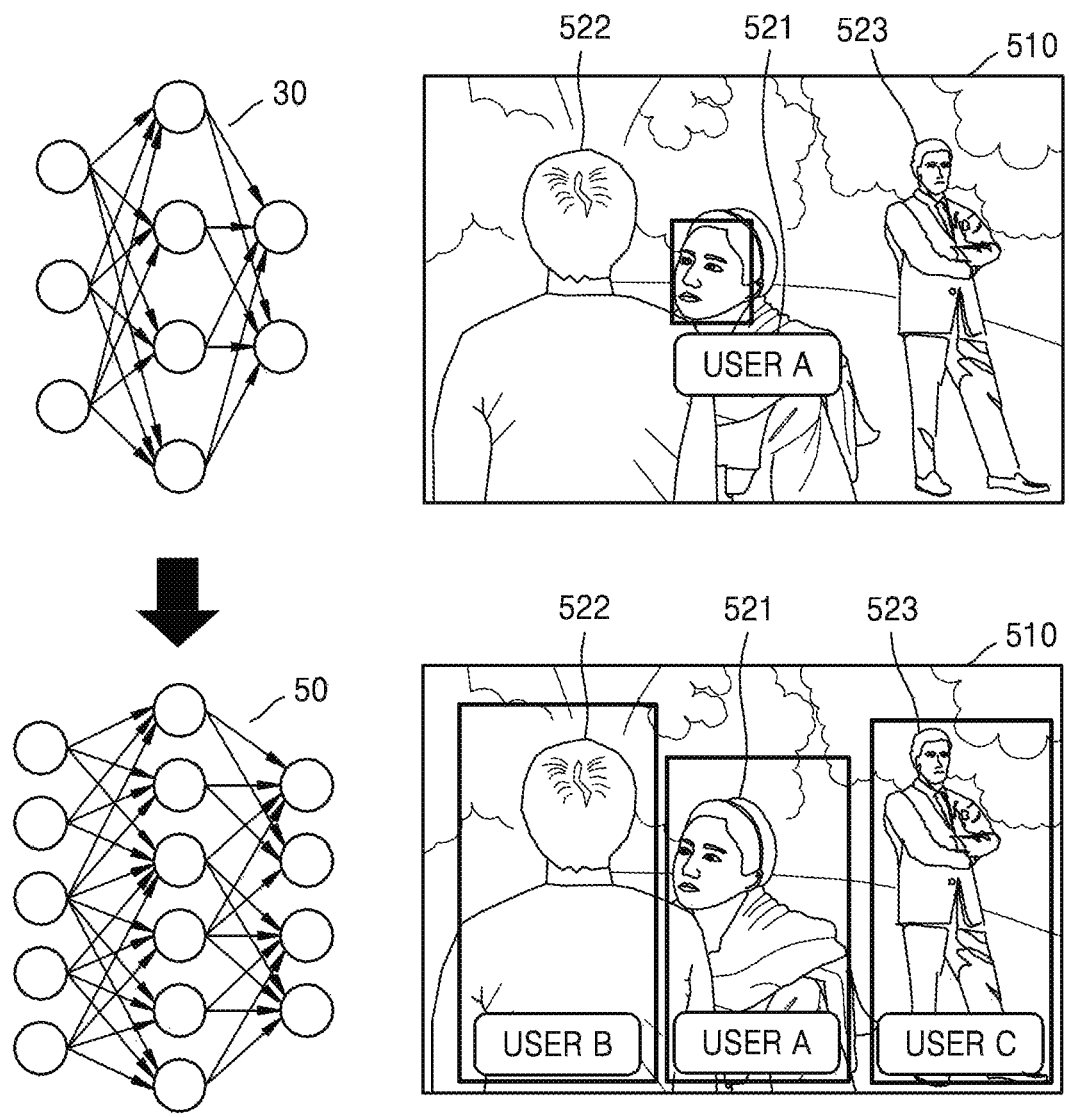
FIG. 5 is a diagram showing a recognition result of a first recognition model and a recognition result of a second recognition model, according to an embodiment of the present disclosure.

FIG. 5 is a diagram showing a recognition result of a first recognition model and a recognition result of a second recognition model, according to an embodiment of the present disclosure.

Referring to FIG. 5, the first recognition model 30 may be a model of extracting face information from a face region of a user image and recognizing a user based on the extracted face information. The second recognition model 50 may be a model of extracting at least one of face information and additional feature information from a person region of the user image and recognizing a user based on the extracted face information and additional feature information. For example, the second recognition model 50 may be a model of recognizing a user by using only additional feature information of the user without face information of the user.

The first recognition model 30 may be additionally learned based on face information of a user and be updated. When the first recognition model 30 is additionally learned based on face information of a user, an accuracy of recognizing a user based on face information may increase.

In addition, the second recognition model 50 may be a model extended by allowing the first recognition model 30 to additionally learn based on additional feature information. For example, the second recognition model 50 may be, but is not limited to, a model with the first recognition model 30 having additionally learned based on additional feature information of a user. The second recognition model 50 may be learned based on additionally collected additional feature information of a user and be updated.

Referring to FIG. 5, the electronic apparatus 100 may obtain a user image 510. The user image 510 may be an image including a user A 521, a user B 522, and a user C 523. In the user image 510, a face of the user A 521 appears clear from the front, and only a rear view of the user B 522 is shown while a face of the user B 522 is not shown. In addition, the user C 523 is far away, and thus, a face of the user C 523 appears blurry.

When the user image 510 is input to the first recognition model 30, the first recognition model 30 recognizes only the user A 521 where a face region may be detected because the first recognition model 30 recognizes a user based on face information, and the user B 522 and the user C 523 may not be recognized because face regions thereof may not be detected.

On the other hand, when the user image 510 is input to the second recognition model 50, all of the user A 521, the user B 522, and the user C 523 may be recognized. For example, the electronic apparatus 100 may recognize the user A 521 based on face information extracted from a face region of the user A 521 and hair style information, clothing style information, etc. extracted from a person region of the user A 521. The electronic apparatus 100 may recognize the user B 522 based on rear view information, clothing style information, etc. extracted from a person region of the user B 522. The electronic apparatus 100 may recognize the user C 523 based on body shape information, gait information, etc. extracted from a person region of the user C 523.

Accordingly, the electronic apparatus 100 may recognize a user by extracting additional feature information of the user even when a face region of the user is not detected in a user image (for example, in the case of a side or rear view image of the user, an image with the user far away, etc.).

Figure 6:
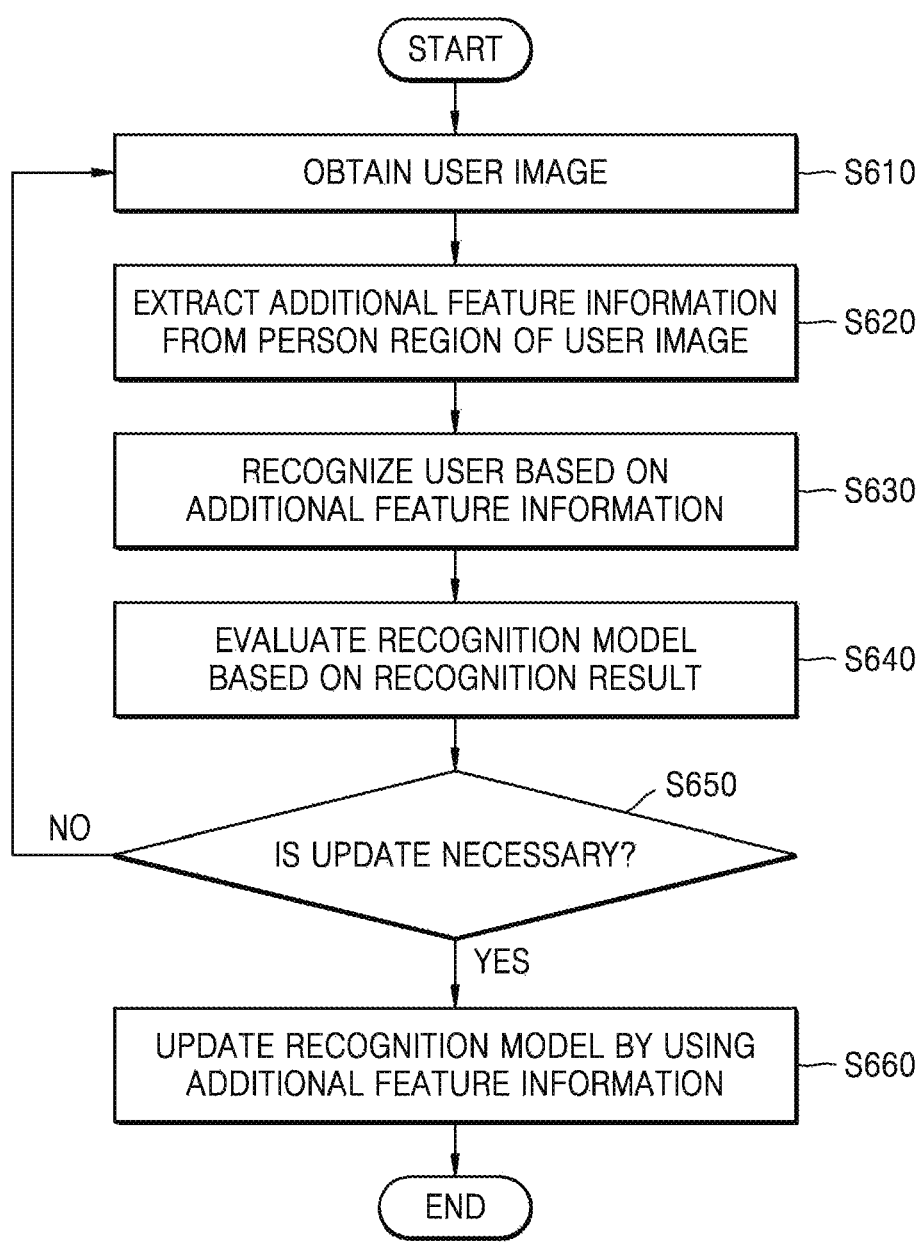
FIG. 6 is a flowchart of a method in which an electronic apparatus updates a second recognition model, according to an embodiment of the present disclosure.

FIG. 6 is a flowchart of a method in which an electronic apparatus updates a second recognition model, according to an embodiment of the present disclosure.

Referring to FIG. 6, in operation S610, the electronic apparatus 100 may obtain a user image.

In operation S620, the electronic apparatus 100 may extract additional feature information from a person region of the obtained user image. A method in which an electronic apparatus extracts additional feature information of a user has been described above with reference to FIG. 4.

In operation S630, the electronic apparatus 100 may recognize a user based on the additional feature information. For example, the electronic apparatus 100 may determine a user corresponding to the extracted additional feature information by comparing the extracted additional feature information with additional feature information matching each of a plurality of users stored in a database. However, the present disclosure is not limited thereto.

In operation S640, the electronic apparatus 100 may evaluate a recognition model based on a recognition result. For example, the electronic apparatus 100 may determine a recognition error when the user recognized based on the additional feature information in operation S630 is compared with a user recognized based on face feature information and the users are determined to be different from each other. Alternatively, the electronic apparatus 100 may determine a recognition error when the user recognized based on the additional feature information and a user recognized based on face feature information are the same as each other but, as a result of recognition based on the additional feature information, a probability of the recognized user is less than a predetermined value.

For example, the electronic apparatus 100 may finally recognize user A as a probability of the user A is determined as 62% and a probability of the user B is determined as 37% as a result of recognizing a user based on additional feature information, and may finally recognize user A as a probability of the user A is determined as 95% as a result of recognition based on face feature information. Although recognition results are the same, as a result of recognition based on additional feature information, a probability of user A is less than a predetermined value, 80%, and thus, the electronic apparatus 100 may determine a recognition error.

However, a method of evaluating a second recognition model is not limited thereto, and the second recognition model may be evaluated in various ways.

In operation S650, the electronic apparatus 100 may determine, based on an evaluation result of the second recognition model, whether it is necessary to update the second recognition model. For example, the electronic apparatus 100 may count the number of recognition errors whenever a user is recognized by using the second recognition model, and thus, when the number of recognition errors is equal to or greater than a predetermined number, may determine that it is necessary to update the second recognition model. Alternatively, the electronic apparatus 100 may calculate a recognition error rate, and thus, when the recognition error rate is equal to or greater than a predetermined value, may determine that it is necessary to update the second recognition model. However, the present disclosure is not limited thereto.

In operation S660, when the second recognition model is necessary to update, the electronic apparatus 100 may allow the second recognition model to additionally learn by using collected additional feature information and thus may update the second recognition model.

The electronic apparatus 100 may update the second recognition model in real time. Alternatively, the electronic apparatus 100 may store collected additional feature information and periodically update the recognition model by using the stored additional feature information, or may update the second recognition model when the electronic apparatus 100 is in an idle state (for example, when the electronic apparatus 100 is being charged), when a user request is input, or when it is a predetermined time. However, the present disclosure is not limited thereto.

In addition, the electronic apparatus 100 may allow the second recognition model to entirely learn or may allow only a portion of the second recognition model to learn. However, the present disclosure is not limited thereto.

Figure 7:
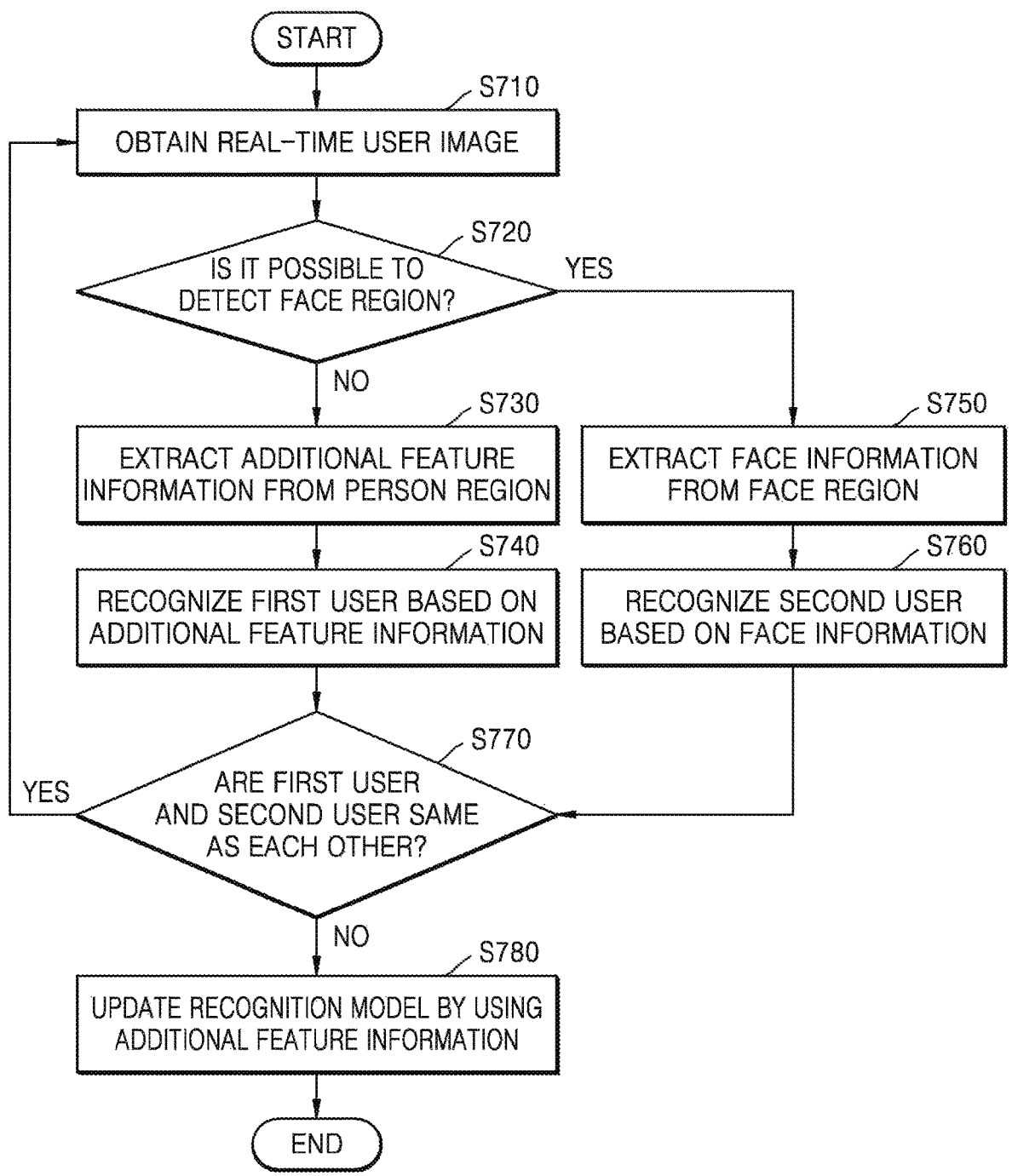
FIG. 7 is a flowchart of a method in which an electronic apparatus updates a second recognition model, according to an embodiment of the present disclosure.

FIG. 7 is a flowchart of a method in which an electronic apparatus updates a second recognition model, according to an embodiment of the present disclosure.

Referring to FIG. 7, in operation S710, the electronic apparatus 100 may obtain user images regarding the same user in real time.

In operation S720, the electronic apparatus 100 may determine whether it is possible to detect a face region in an image obtained in real time, and in operation S730, when it is not possible to detect a face region, the electronic apparatus 100 may detect a person region in the user image and may extract additional feature information of the user from the person region. A method in which an electronic apparatus extracts additional feature information of a user has been described above with reference to FIG. 4.

In operation S740, the electronic apparatus 100 may recognize, based on the extracted additional feature information, a first user in the user image.

In operation S750, when it is possible to detect a face region, the electronic apparatus 100 may extract face information from the face region, and in operation S760, the electronic apparatus 100 may recognize a second user based on the face information. A method in which an electronic apparatus recognizes a user based on face information has been described above with reference to FIG. 3.

In operation S770, the electronic apparatus 100 may determine whether the recognized first user and second user are the same as each other, and when the first user and the second user are not the same as each other, the electronic apparatus 100 may determine that a second recognition model is necessary to update.

In operation S780, the electronic apparatus 100 may update the second recognition model by using the additional feature information. For example, the electronic apparatus 100 may allow the second recognition model to learn by matching the additional feature information extracted in operation S730 with the second user recognized in operation S760 and thus may update the second recognition model. However, the present disclosure is not limited thereto.

In addition, the electronic apparatus 100 may update the second recognition model in real time, or may store additional feature information and then may update the second recognition model at a predetermined time by using the stored additional feature information. The electronic apparatus 100 may allow the second recognition model to entirely learn or may allow only a portion of the second recognition model to learn. However, the present disclosure is not limited thereto.

Figure 8:
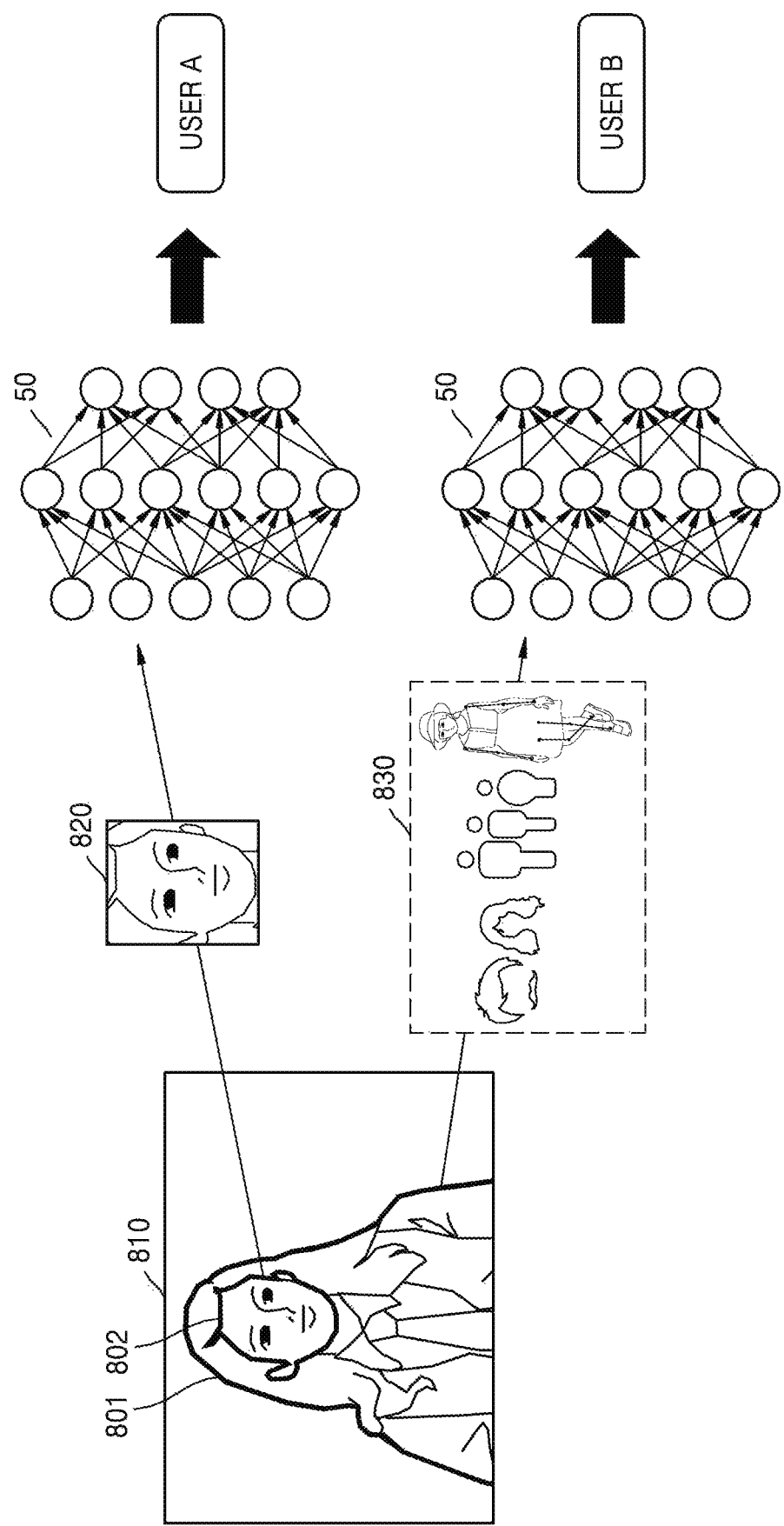
FIG. 8 is a diagram of a method in which an electronic apparatus determines whether to update a recognition model, according to an embodiment of the present disclosure.

FIG. 8 is a diagram of a method in which an electronic apparatus determines whether to update a recognition model, according to an embodiment of the present disclosure.

Referring to FIG. 8, the electronic apparatus 100 may obtain a user image 810. The user image 810 may be an image captured in the electronic apparatus 100 or an image received from an external apparatus. In addition, the user image 810 may be an image where a face region may be detected.

The electronic apparatus 100 may detect a face region 802 in the user image 810 and may extract face information 820 from the detected face region 802. This has been described above with reference to FIG. 3.

Referring to FIG. 8, the electronic apparatus 100 may recognize user A based on the face information 820.

In addition, the electronic apparatus 100 may detect a person region 801 in the user image 810 and may extract additional feature information 830 from the detected person region 801. This has been described with reference to FIG. 4, and thus, a detailed description thereof is omitted.

The electronic apparatus 100 may recognize "user B" based on the extracted additional feature information 830.

Referring to FIG. 8, when a user recognized in the user image 810 based on the face information 820 is user A, and a user recognized in the user image 810 based on the additional feature information 830 is user B, the electronic apparatus 100 may determine that a recognition result of the second recognition model 50 is not accurate. In addition, the electronic apparatus 100 may determine that the recognition model is necessary to update, and may allow the second recognition model 50 to additionally learn by matching the extracted additional feature information 830 with user A and thus may update the second recognition model 50. However, the present disclosure is not limited thereto.

Figure 9:
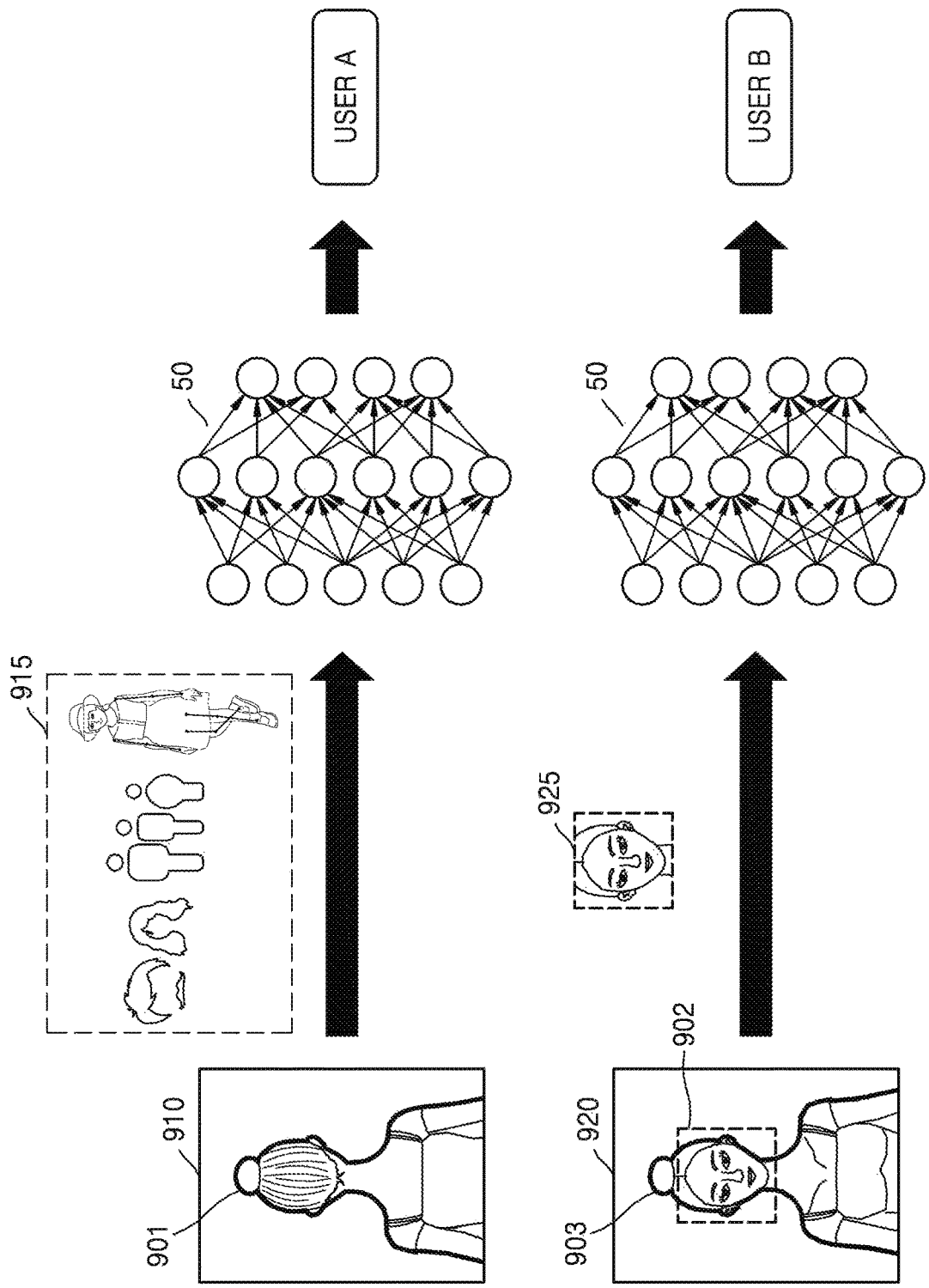
FIG. 9 is a diagram of a method in which an electronic apparatus determines whether to update a recognition model, according to an embodiment of the present disclosure.

FIG. 9 is a diagram of a method in which an electronic apparatus determines whether to update a recognition model, according to an embodiment of the present disclosure.

Referring to FIG. 9, the electronic apparatus 100 may obtain user images regarding the same user in real time. For example, referring to FIG. 9, the electronic apparatus 100 may obtain a first user image 910 and a second user image 920 regarding the same user.

The first user image 910 may be an image where a face region is not detected. The electronic apparatus 100 may detect a person region 901 in the first user image 910 and may extract additional feature information 915 of the user from the person region 901. For example, the electronic apparatus 100 may extract rear view information of the user, hair style information of the user, hair color information, clothing style information, clothing color information, body shape or body proportion information of the user, etc. from the person region 901. The electronic apparatus 100 may recognize user A in the first user image 910 based on the extracted additional feature information 915.

The second user image 920 may be an image where a face region is detected. The electronic apparatus 100 may detect a face region 902 in the second user image 920 and may extract face information 925 of the user from the face region 902. For example, the electronic apparatus 100 may extract various feature parameters such as a face shape or size, a face length, a face width, a distance between eyebrows, a nose bridge length, a lip tail angle, a lip length, an eye size, an eye location, an eye tail angle, a nose size, an ear location, an eyebrow thickness, an eyebrow location, an eyebrow length, etc. from the face region 902 and may determine face information based on the extracted feature parameters.

The electronic apparatus 100 may recognize user B in the second user image 920 based on extracted face information of the user. However, the present disclosure is not limited thereto, and the electronic apparatus 100 may detect a person region 903 in the second user image 920, extract additional feature information of the user from the person region 903, and recognize the user based on the face information 925 and the additional feature information.

When user A recognized in the first user image 910 and user B recognized in the second user image 920 are not the same as each other, the electronic apparatus 100 may allow the second recognition model 50 to additionally learn by using the additional feature information 915 extracted from the first user image 910 and thus may update the second recognition model 50. In this regard, the electronic apparatus 100 may allow the second recognition model 50 to additionally learn by matching the additional feature information 915 with user B and thus may update the second recognition model 50. However, the present disclosure is not limited thereto.

The electronic apparatus 100 may update the second recognition model 50 in real time. Alternatively, the electronic apparatus 100 may store the additional feature information 915 and periodically update the recognition model by using the stored additional feature information 915, or may update the second recognition model 50 when the electronic apparatus 100 is in an idle state (e.g., when the electronic apparatus 100 is being charged), when a user request is input, or when it is a predetermined time. However, the present disclosure is not limited thereto.

In addition, the electronic apparatus 100 may allow the second recognition model 50 to entirely learn or may allow only a portion of the second recognition model 50 to learn. However, the present disclosure is not limited thereto.

Figure 10:
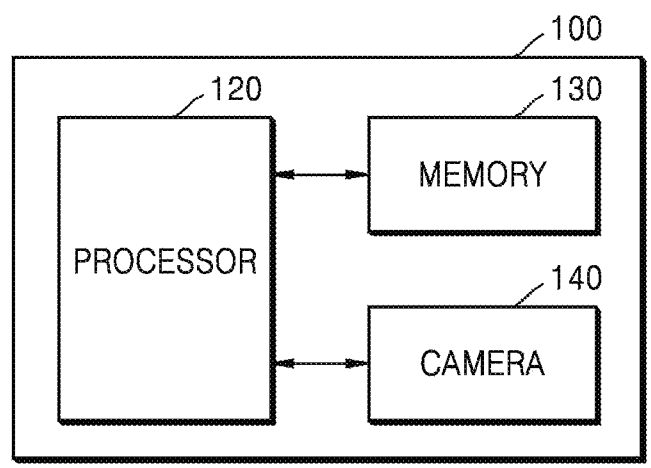
FIG. 10 is a block diagram of a structure of an electronic apparatus, according to an embodiment of the present disclosure.

FIG. 10 is a block diagram of a structure of an electronic apparatus, according to an embodiment of the present disclosure.

Referring to FIG. 10, the electronic apparatus 100 may include a camera 140, a processor 120, and a memory 130.

The camera 140 may obtain an image frame such as a still image or video through an image sensor. An image captured through the image sensor may be processed through the processor 120. The camera 140 according to an embodiment may obtain a user image by capturing an image of a user intended to be recognized.

The processor 120 may execute one or more programs stored in the memory 130. The processor 120 may include a single core, dual core, triple core, quad core, and multiple cores. In addition, the processor 120 may include a plurality of processors. For example, the processor 120 may be implemented as a main processor (not shown) and a sub processor (not shown) operating in a sleep mode.

The memory 130 may store various data, programs, or applications for driving and controlling the electronic apparatus 100.

The program stored in the memory 130 may include one or more instructions. The program (one or more instructions) or the application stored in the memory 130 may be executed by the processor 120.

The processor 120 may extract face information from a face region of a user image by using a first recognition model stored in the memory 130 and may recognize a user by comparing the extracted face information with face information regarding a plurality of users registered in the electronic apparatus 100. In addition, the processor 120 may detect a person region in the user image by executing one or more instructions stored in the memory 130 and may extract additional feature information such as appearance information or behavior information of the user from the person region. The processor 120 may match the extracted additional feature information with the user by executing one or more instructions stored in the memory 130 and thus may allow the first recognition model to additionally learn. The processor 120 may store an additionally learned second recognition model in the memory 130. The processor 120 may use the additionally learned second recognition model by executing one or more instructions stored in the memory 130 and thus may recognize the user from the person region of the user image.

The processor 120 may evaluate a recognition result of the second recognition model by executing one or more instructions stored in the memory 130 and thus may determine whether the second recognition model is necessary to update, and when it is determined that the second recognition model is necessary to update, the processor 120 may allow the second recognition model to additionally learn based on additional feature information collected in real time and thus may update the second recognition model.

Figure 11:
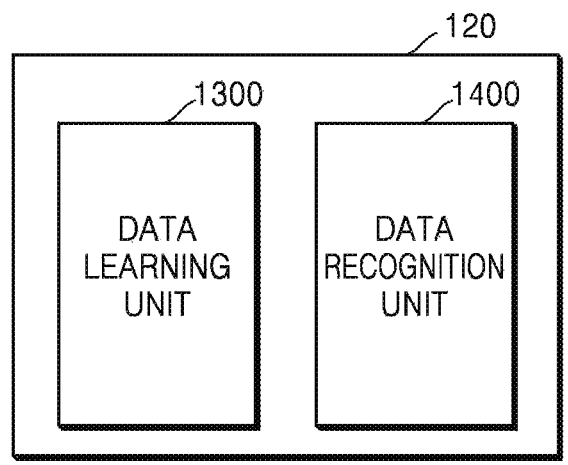
FIG. 11 is a block diagram of a processor according to various embodiments of the present disclosure.

FIG. 11 is a block diagram of a processor according to an embodiment of the present disclosure.

Referring to FIG. 11, the processor 120 may include a data learning unit 1300 and a data recognition unit 1400.

The data learning unit 1300 may generate a data recognition model or allow a data recognition model to learn so that the data recognition model may have a criterion for recognizing a user in a user image. The data learning unit 1300 may generate a data recognition model having a criterion of determination by applying learning data to the data recognition model in order to recognize a user in a user image.

The data learning unit 1300 may generate a data recognition model or allow a data recognition model to learn by using learning data related to an image. The data recognition model may include a first recognition model and a second recognition model.

The data recognition unit 1400 may recognize a user based on recognition data. The data recognition unit 1400 may recognize a user from a predetermined user image by using a learned data recognition model. The data recognition unit 1400 may obtain predetermined data (e.g., a user image) according to a predetermined criterion by learning and may recognize a user based on the user image by using a data recognition model with the obtained data as an input value. For example, a user may be recognized based on face information of the user extracted from a face region of the user image, or may be recognized based on additional feature information such as appearance information or behavior information of the user extracted from a person region of the user image. In addition, a result value output by the data recognition model with the obtained data as an input value may be used to update the data recognition model.

At least a portion of the data learning unit 1300 and at least a portion of the data recognition unit 1400 may be implemented as a software module or manufactured in the form of at least one hardware chip and be equipped in an electronic apparatus. For example, at least one of the data learning unit 1300 and the data recognition unit 1400 may be manufactured in the form of an exclusive hardware chip for artificial intelligence (AI) or may be manufactured as a portion of an existing general-use processor (e.g., a central processing unit (CPU) or an application processor) or a graphic exclusive processor (e.g., a graphics processing unit (GPU)) and be equipped in various kinds of electronic apparatuses described above.

The exclusive hardware chip for AI, which is an exclusive processor specified for probability computation, has a higher parallel processing performance than the existing general-use processor and thus may quickly process a computation job of an AI field such as machine learning. When the data learning unit 1300 and the data recognition unit 1400 are implemented as a software module (or a program module including an instruction), the software module may be stored in a non-transitory computer-readable recording medium. In this case, the software module may be provided by an operating system (OS) or may be provided by a predetermined application. Alternatively one portion of the software module may be provided by the OS, and the other portion thereof may be provided by the predetermined application.

The data learning unit 1300 and the data recognition unit 1400 may be installed in one electronic apparatus or may be respectively installed in individual electronic apparatuses. For example, one of the data learning unit 1300 and the data recognition unit 1400 may be included in an electronic apparatus, and the other may be included in a server. In addition, the data learning unit 1300 and the data recognition unit 1400 may be connected in a wired or wireless manner to provide model information constructed by the data learning unit 1300 to the data recognition unit 1400 and provide data input to the data recognition unit 1400 to the data learning unit 1300 as additional learning data.

Figure 12:
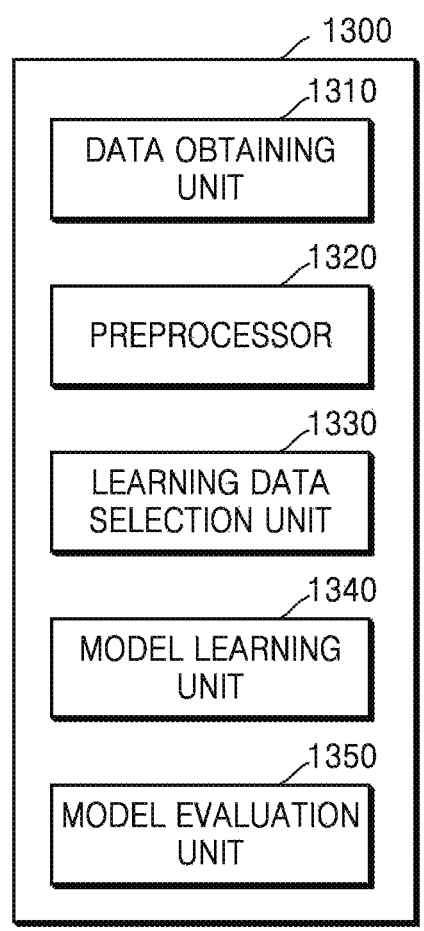
FIG. 12 is a block diagram of a data learning unit according to various embodiments of the present disclosure.

FIG. 12 is a block diagram of a data learning unit according to an embodiment of the present disclosure.

Referring to FIG. 12, the data learning unit 1300 may include a data obtaining unit 1310 and a model learning unit 1340. In addition, the data learning unit 1300 may selectively further include at least one of a preprocessor 1320, a learning data selection unit 1330, and/or a model evaluation unit 1350. The data obtaining unit 1310 may obtain learning data required for learning for recognizing a user.

Data collected or tested by the data learning unit 1300 or a manufacturer of an electronic apparatus may be used as the learning data. Alternatively, the learning data may include image data generated from a user image input through a camera according to the present disclosure. In this regard, although the camera may be included in the electronic apparatus, this is merely an embodiment, and image data obtained through an external camera may be used as the learning data.

The data obtaining unit 1310 may obtain a plurality of user images. For example, the data obtaining unit 1310 may receive a user image through a camera of an electronic apparatus including the data learning unit 1300. Alternatively, a user image may be received through an external apparatus capable of communicating with an electronic apparatus including the data learning unit 1300.

The model learning unit 1340 may learn a criterion of how a data recognition model will recognize a user in a user image by using learning data. For example, the model learning unit 1340 may allow a data recognition model to learn through supervised learning in which at least a portion of learning data is used as a criterion of determination. Alternatively, the model learning unit 1340 may allow a data recognition model to learn through unsupervised learning in which a criterion of detecting a face region or a person region in a user image, a criterion of extracting face information from the face region, and a criterion of extracting additional feature information from the person region are discovered, for example, by learning by itself using learning data without supervision.

In addition, the model learning unit 1340 may learn a criterion of which learning data will be used to recognize a user.

The model learning unit 1340 according to an embodiment of the present disclosure may generate a data recognition model or allow a data recognition model to learn by using learning data related to a criterion of detecting a face region or a person region in a user image, a criterion of extracting face information from the face region, and a criterion of extracting additional feature information from the person region. In this case, when the data recognition model is allowed to learn through supervised learning, as criteria of determination, the criterion of detecting a face region or a person region in a user image, the criterion of extracting face information from the face region, and the criterion of extracting additional feature information from the person region may be added as learning data.

For example, the model learning unit 1340 may generate a data recognition model or allow a data recognition model to learn by using learning data related to a criterion of detecting a face region or a person region in a user image, a criterion of extracting face information from the face region, and a criterion of extracting additional feature information from the person region. In addition, the model learning unit 1340 may learn so as to recognize a user based on face information of a plurality of users stored in a database and face information of a user extracted from a user image. Alternatively, the model learning unit 1340 may learn so as to recognize a user based on additional feature information of a plurality of users stored in a database and additional feature information of a user extracted from a user image.

The model learning unit 1340 may allow a data recognition model that recognizes a user in a user image to learn by using learning data. In this case, the data recognition model may be a previously constructed model. For example, the data recognition model may be a model previously constructed by receiving basic learning data (e.g., a sample image, etc.).

The data recognition model may be constructed by taking into account an application field of the data recognition model, a purpose of learning, or computer performance of an apparatus. The data recognition model may be, for example, a model based on neural network. For example, a model such as DNN, RNN, or BRDNN may be used as the data recognition model, but the present disclosure is not limited thereto.

When there are a plurality of previously constructed data recognition models, the data learning unit 1340 may determine a data recognition model in which input learning data and basic learning data have a high relevance as a data recognition model which will learn. In this case, the basic learning data may be previously classified according to types of data, and the data recognition model may be previously constructed according to types of data. For example, the basic learning data may be previously classified according to various criteria such as an area where learning data is generated, a time when learning data is generated, a size of learning data, a genre of learning data, a generator of learning data, and a type of an object within learning data.

The model learning unit 1340 may allow a data recognition model to learn by using a learning algorithm, etc. including, for example, an error back-propagation method or a gradient descent method.

The model learning unit 1340 may allow a data classification model to learn, for example, through supervised learning with learning data as an input value. The model learning unit 1340 may allow a data classification model to learn, for example, through unsupervised learning in which a criterion for judging a situation is discovered by learning by itself a type of data required of judging a situation without supervision. The model learning unit 1340 may allow a data recognition model to learn, for example, through reinforcement learning using a feedback regarding whether a result of image classification according to learning is correct.

When a data recognition model is learned, the model learning unit 1340 may store the learned data recognition model. In this case, the model learning unit 1340 may store the learned data recognition model in a memory of an electronic apparatus including the data recognition unit 1400. The model learning unit 1340 may store a learned data classification model in a memory of an electronic apparatus including the data recognition unit 1400 described below. The model learning unit 1340 may store a learned data classification model in a memory of a server connected to an electronic apparatus via a wired or wireless network.

A memory in which the learned data recognition model is stored may also store, for example, a command or data related to at least one other component of an electronic apparatus. In addition, the memory may store software and/or a program. The program may include, for example, a kernel, middleware, an application programming interface (API) and/or an application program (or "application").

The data learning unit 1300 may further include the preprocessor 1320 and the learning data selection unit 1330 to improve a recognition result of a data recognition model or save a resource or time required to generate a data recognition model.

The preprocessor 1320 may preprocess data obtained in the data obtaining unit 1310 to use the data in learning for recognizing a user. For example, the preprocessor 1320 may process the obtained data into a predefined format to facilitate use of data for learning of a data recognition model. The preprocessed data may be provided to the model learning unit 1340 as learning data.

The learning data selection unit 1330 may selectively select learning data required for learning from among the preprocessed data. The selected learning data may be provided to the model learning unit 1340. The learning data selection unit 1330 may select learning data required for learning from among the preprocessed data according to a preset criterion of selection. In addition, the learning data selection unit 1330 may select learning data required for learning according to a criterion of selection preset by learning in the model learning unit 1340.

The data learning unit 1300 may further include the model evaluation unit 1350 to improve a recognition result of a data recognition model. The model evaluation unit 1350 may input evaluation data to a data recognition model, and if a recognition result output from the evaluation data does not satisfy a certain criterion, the model evaluation unit 1350 may allow the model learning unit 1340 to learn again. In this case, the evaluation data may be preset data for evaluating the data recognition model.

For example, when the number or percentage of evaluation data of which a recognition result is not accurate among classification results of the learned data recognition model for evaluation data exceeds a preset threshold, the model evaluation unit 1350 may evaluate that a certain criterion is not satisfied. For example, when the certain criterion is defined as 2%, if the learned data recognition model outputs wrong recognition results for more than 20 evaluation data among a total of 1000 evaluation data, the model evaluation unit 1350 may evaluate that the learned data recognition model is not suitable.

When there are a plurality of learned data recognition models, the model evaluation unit 1350 may evaluate whether each of the learned data recognition models satisfies a certain criterion and may determine a model satisfying the certain criterion as a final data recognition model. In this case, when a plurality of models satisfy the certain criterion, the model evaluation unit 1350 may determine any one model or a predetermined number of models preset in an order of higher evaluation score as the final data recognition model.

At least one of the data obtaining unit 1310, the preprocessor 1320, the learning data selection unit 1330, the model learning unit 1340, and the model evaluation unit 1350 in the data learning unit 1300 may be manufactured in the form of at least one hardware chip and be equipped in an electronic apparatus. For example, at least one of the data obtaining unit 1310, the preprocessor 1320, the learning data selection unit 1330, the model learning unit 1340, and the model evaluation unit 1350 may be manufactured in the form of an exclusive hardware chip for AI or may be manufactured as a portion of an existing general-use processor (e.g., a CPU or an application processor) or a graphic exclusive processor (e.g., a GPU) and be equipped in various types of electronic apparatuses described above.

In addition, the data obtaining unit 1310, the preprocessor 1320, the learning data selection unit 1330, the model learning unit 1340, and the model evaluation unit 1350 may be installed in one electronic apparatus or may be respectively installed in individual electronic apparatuses. For example, some of the data obtaining unit 1310, the preprocessor 1320, the learning data selection unit 1330, the model learning unit 1340, and the model evaluation unit 1350 may be included in an electronic apparatus, and the other some may be included in a server.

In addition, at least one of the data obtaining unit 1310, the preprocessor 1320, the learning data selection unit 1330, the model learning unit 1340, and the model evaluation unit 1350 may be implemented as a software module. When at least one of the data obtaining unit 1310, the preprocessor 1320, the learning data selection unit 1330, the model learning unit 1340, and the model evaluation unit 1350 is implemented as a software module (or a program module including an instruction), the software module may be stored in a non-transitory computer-readable recording medium. In addition, in this case, at least one software module may be provided by an OS or may be provided by a predetermined application. Alternatively, one portion of at least one software module may be provided by the OS, and the other portion may be provided by the predetermined application.

Figure 13:
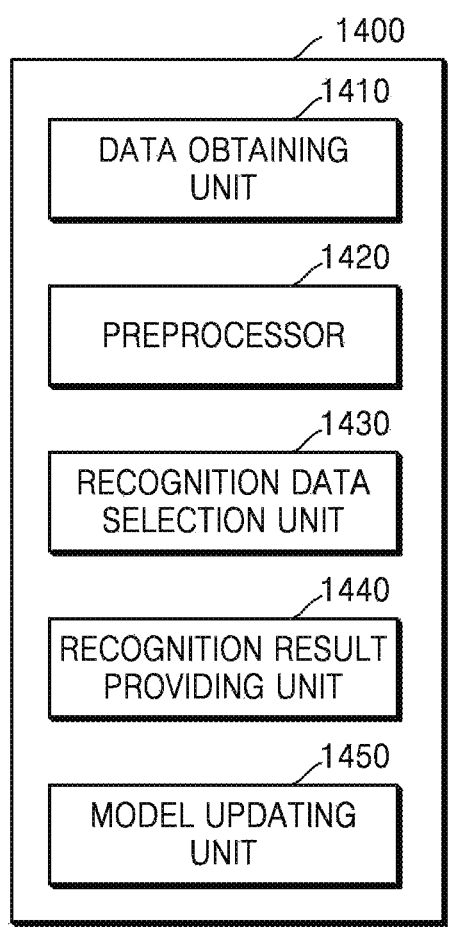
FIG. 13 is a block diagram of a data recognition unit according to various embodiments of the present disclosure.

FIG. 13 is a block diagram of a data recognition unit according to an embodiment of the present disclosure.

Referring to FIG. 13, the data recognition unit 1400 may include a data obtaining unit 1410 and a recognition result providing unit 1440. The data recognition unit 1400 may selectively further include at least one of a preprocessor 1420, a recognition data selection unit 1430, and/or a model updating unit 1450.

The data obtaining unit 1410 may obtain data required for user recognition, and the preprocessor 1420 may preprocess the obtained data to use the data obtained for user recognition. The preprocessor 1420 may process the obtained data into a preset format such that the recognition result providing unit 1440 described below uses the data obtained for user recognition.

The recognition result providing unit 1440 may recognize a user by applying selected data to a data recognition model. The recognition result providing unit 1440 may provide a recognition result according to a purpose of data recognition. The recognition result providing unit 1440 may use data selected by the recognition data selection unit 1430 as an input value and thus may apply the selected data to the data recognition model. In addition, the recognition result may be determined by the data recognition model.

For example, the recognition result providing unit 1440 may display information regarding a recognized user, or may output an alarm or a warning message when the recognized user is not a fair user. Alternatively, when the recognized user is a fair user, a predetermined service may be provided.

The data recognition unit 1400 may further include the preprocessor 1420 and the recognition data selection unit 1430 to improve a recognition result of a data recognition model or save a resource or time for providing a recognition result.

The preprocessor 1420 may preprocess data obtained in the data obtaining unit 1410 to learn a criterion of determination for recognizing a user in a user image. The preprocessor 1420 may process the obtained data into a predefined format to facilitate use of data for learning a criterion of determination for user recognition.

The recognition data selection unit 1430 may select data required for user recognition from among the preprocessed data. The selected data may be provided to the recognition result providing unit 1440. The recognition data selection unit 1430 may select a portion or all of the preprocessed data according to a preset criterion for user recognition. In addition, the recognition data selection unit 1430 may select data according to a criterion preset by learning in the model learning unit 1340.

The model updating unit 1450 may update a data recognition model based on evaluation regarding a recognition result provided by the recognition result providing unit 1440. For example, the model updating unit 1450 may allow the model learning unit 1340 to update the data recognition model by providing the recognition result provided by the recognition result providing unit 1440 to the model learning unit 1340.

At least one of the data obtaining unit 1410, the preprocessor 1420, the recognition data selection unit 1430, the recognition result providing unit 1440, and/or the model updating unit 1450 in the data recognition unit 1400 may be implemented as a software module or may be manufactured in the form of at least one hardware chip and be equipped in an electronic apparatus. For example, at least one of the data obtaining unit 1410, the preprocessor 1420, the recognition data selection unit 1430, the recognition result providing unit 1440, and/or the model updating unit 1450 may be manufactured in the form of an exclusive hardware chip for AI or may be manufactured as a portion of an existing general-use processor (e.g., a CPU or an application processor) or a graphic exclusive processor (e.g., a GPU) and be installed in various types of electronic apparatuses described above.

In addition, the data obtaining unit 1410, the preprocessor 1420, the recognition data selection unit 1430, the recognition result providing unit 1440, and the model updating unit 1450 may be installed in one electronic apparatus or may be respectively installed in individual electronic apparatuses. For example, some of the data obtaining unit 1410, the preprocessor 1420, the recognition data selection unit 1430, the recognition result providing unit 1440, and the model updating unit 1450 may be included in an electronic apparatus, and the remainder may be included in a server.

In addition, at least one of the data obtaining unit 1410, the preprocessor 1420, the recognition data selection unit 1430, the recognition result providing unit 1440, and the model updating unit 1450 may be implemented as a software module. When at least one of the data obtaining unit 1410, the preprocessor 1420, the recognition data selection unit 1430, the recognition result providing unit 1440, and/or the model updating unit 1450 is implemented as a software module (or a program module including an instruction), the software module may be stored in a non-transitory computer-readable recording medium. In addition, in this case, at least one software module may be provided by an OS or may be provided by a predetermined application. Alternatively, one portion of at least one software module may be provided by the OS, and the other portion may be provided by the predetermined application.

Figure 14:
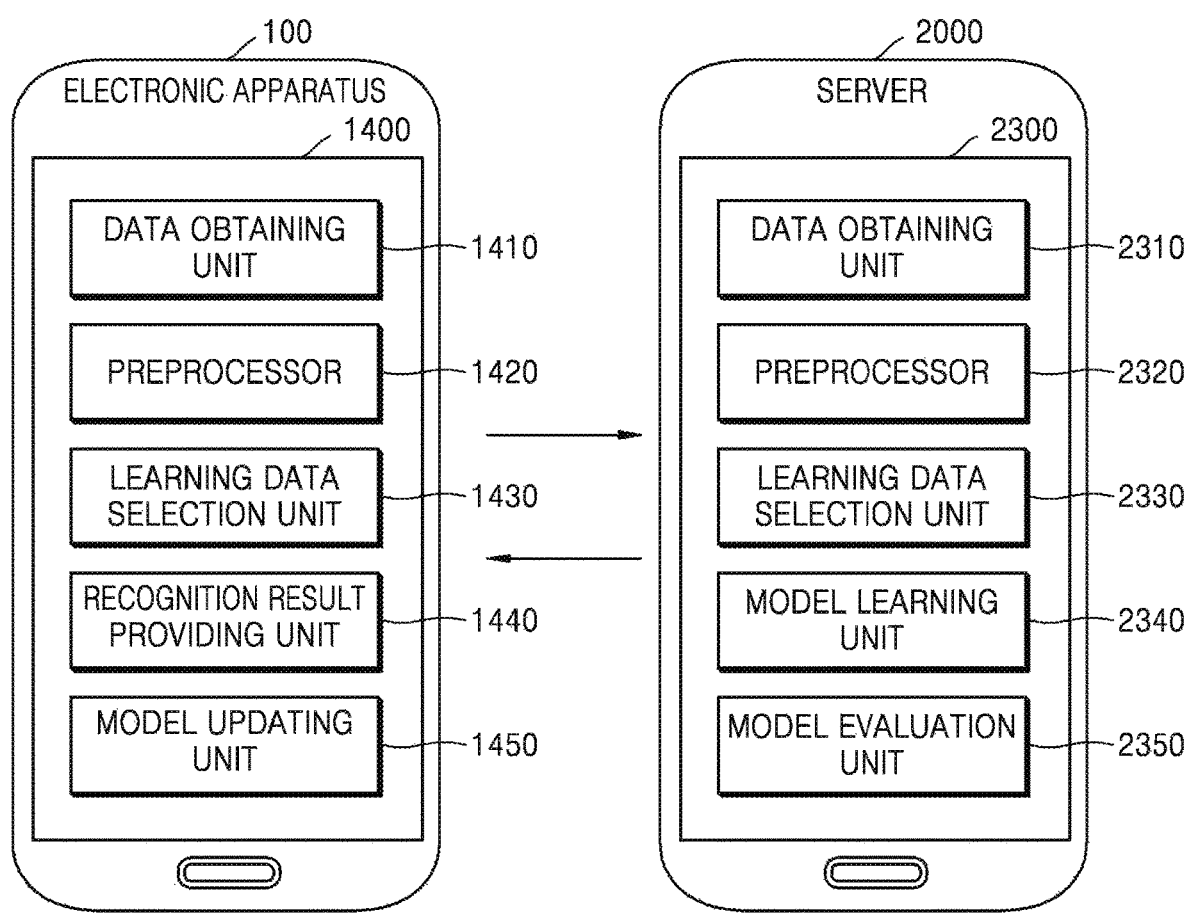
FIG. 14 is a diagram of an example in which data is learned and recognized by an electronic apparatus and a server interworking with each other, according to an embodiment of the present disclosure.

FIG. 14 is a diagram of an example in which data is learned and recognized by an electronic apparatus and a server interworking with each other, according to an embodiment of the present disclosure.

Referring to FIG. 14, a server 2000 may learn a criterion for recognizing a user by analyzing a user image, and the electronic apparatus 100 may recognize a user based on a learning result by a data learning unit 2300 of the server 2000. The data learning unit 2300 may include a data obtaining unit 2310, a preprocessor 2320, a learning data selection unit 2330, a model learning unit 2340, and/or a model evaluation unit 2350.

In this case, the model learning unit 2340 of the server 2000 may perform functions of the model learning unit 1340 shown in FIG. 12. The model learning unit 2340 of the server 2000 may analyze an image and thus may learn a criterion regarding which data will be used to recognize a user and how the user will be recognized by using data. The model learning unit 2340 may obtain data which will be used in learning and may learn a criterion for user recognition by applying the obtained data to a data recognition model described below.

The recognition result providing unit 1440 of the electronic apparatus 100 may judge a situation by applying data selected by the recognition data selection unit 1430 to the data recognition model generated by the server 2000. For example, the recognition result providing unit 1440 may transmit data selected by the recognition data selection unit 1430 to the server 2000, and the server 2000 may request recognizing a user by applying data selected by the recognition data selection unit 1430 to the recognition model. In addition, the recognition result providing unit 1440 may receive information regarding a user recognized by the server 2000 from the server 2000.

Alternatively, the recognition result providing unit 1440 of the electronic apparatus 100 may receive the recognition model generated by the server 2000 from the server 2000, may analyze an image by using the received recognition model, and may recognize a user. In this case, the recognition result providing unit 1440 of the electronic apparatus 100 may recognize the user by applying data selected by the recognition data selection unit 1430 to the data recognition model received from the server 2000.

FIG. 15 is a block diagram of a structure of an electronic apparatus 300, according to an embodiment of the present disclosure. The electronic apparatus 300 of FIG. 15 may be an embodiment of the electronic apparatus 100 of FIG. 1.

Referring to FIG. 15, the electronic apparatus 300 may include a processor 330, a sensor 320, a communicator 340, an output interface 350, a user input interface 360, an audio/video (A/V) input interface 370, and a storage unit 380.

The processor 330, the storage unit 380, and a camera 371 of FIG. 15 may respectively correspond to the processor 120, the memory 130, and the camera 140 of FIG. 10. A description of those components shown in FIG. 15 that have already been described with reference to FIG. 10 will be omitted.

The communicator 340 may include one or more components for communication between the electronic apparatus 300 and an external apparatus (e.g., a server). For example, the communicator 340 may include a short-range wireless communicator 341, a mobile communicator 342, and a broadcast receiver 343.

The short-range wireless communicator 341 may include a Bluetooth communicator, a near field communicator, a wireless local area network (WLAN) communicator, a Zigbee communicator, an infrared data association (IrDA) communicator, a WFD (Wi-Fi Direct) communicator, an ultra wideband (UWB) communicator, and an Ant+ communicator, but is not limited thereto.

The mobile communicator 342 may transmit and receive a wireless signal to and from at least one of a base station, an external terminal, and a server on a mobile communication network. In this regard, the wireless signal may include a voice call signal, a video call signal, or various types of data generated during text/multimedia message transmission/reception.

The broadcast receiver 343 may externally receive a broadcast signal and/or broadcast-related information through a broadcast channel. The broadcast channel may include a satellite channel and a terrestrial channel. In some embodiments, the electronic apparatus 300 may omit the broadcast receiver 343.

The communicator 340 may receive at least one user image from an external apparatus.

The output interface 350 may be used to output an audio signal, a video signal, or a vibration signal and may include a display 351, a sound output interface 352, and a vibration motor 353.

The display 351 may generate a driving signal by converting an image signal, a data signal, an on-screen display (OSD) signal, a control signal, etc. processed in the processor 120. The display 351 may be implemented as a plasma display panel (PDP), a liquid crystal display (LCD), an organic light-emitting diode (OLED), a flexible display, etc. and may also be implemented as a three-dimensional (3D) display. In addition, the display 351 may be configured as a touchscreen and be used as an input apparatus in addition to an output apparatus.

The display 351 may display a user image. The image displayed on the display 351 may be, but is not limited to, at least one of an image captured in the electronic apparatus 300, an image stored in the electronic apparatus 300, and an image received from an external apparatus. In addition, the display 351 may display a user recognition result. For example, the display 351 may display information regarding a recognized user or may display a warning message when the recognized user is not a fair user. Alternatively, when the recognized user is not a registered user, the display 351 may display a recognition error message or may display a message asking whether to register a new user. However, the present disclosure is not limited thereto.

The sound output interface 352 may output audio data received from the communicator 340 or stored in the storage unit 380. In addition, the sound output interface 352 may output a sound signal related to a function performed in the electronic apparatus 300 (e.g., a call signal reception sound, a message reception sound, or a notification sound). The sound output interface 352 may include a speaker, a buzzer, etc. For example, the sound output interface 352 may output an alarm when a recognized user is not an authorized user.

The vibration motor 353 may output a vibration signal. For example, the vibration motor 353 may output a vibration signal corresponding to an output of audio data or video data (e.g., a call signal reception sound, a message reception sound, etc.). In addition, the vibration motor 353 may output a vibration signal when a touch is input to a touchscreen.

The processor 330 may control overall operations of the electronic apparatus 300. For example, the processor 330 may control the communicator 340, the output interface 350, the user input interface 360, the sensor 320, the A/V input interface 370, and the like by executing programs stored in the storage unit 380.

The user input interface 360 refers to a means for inputting data for controlling the electronic device 300. The user input interface 360 may include a key pad, a dome switch, a touch pad (e.g., a touch-type capacitive touch pad, a pressure-type resistive overlay touch pad, an infrared ray sensing touch pad, a surface acoustic wave conduction touch pad, an integration-type tension measurement touch pad, a piezo effect-type touch pad, etc.), a jog wheel, and a jog switch, but is not limited thereto.

The sensor 320 may include not only a sensor for sensing body information of a user but also a sensor for sensing a state of the electronic apparatus 300 or a state of the vicinity of the electronic apparatus 300 and may transmit information sensed in the sensor to the processor 330.

The sensor 320 may include, but is not limited to, at least one of a geomagnetic sensor 321, an acceleration sensor 322, a temperature/humidity sensor 323, an infrared sensor 324, a gyroscope sensor 325, a position sensor 326 (e.g., a global positioning system (GPS)), a barometric pressure sensor 327, a proximity sensor 328, and a red, blue and green (RGB) sensor (illuminance sensor) 329. A function of each sensor may be intuitively inferred from the name by those of ordinary skill in the art, and thus, a detailed description thereof is omitted.

The A/V input interface 370 may be used to input an audio signal or a video signal, and may include the camera 371 and a microphone 372. The camera 371 may obtain a video frame, such as a still image or a moving picture, through an image sensor in a video call mode or a shooting mode. An image captured through the image sensor may be processed through the processor 330 or a separate image processor (not shown).

A video frame processed in the camera 371 may be stored in the storage unit 380 or may be transmitted to the outside through the communicator 340. Two or more cameras 371 may be provided depending on configuration of the electronic apparatus 300.

The microphone 372 may receive an external acoustic signal and process the external acoustic signal to electrical voice data. For example, the microphone 372 may receive an acoustic signal from an external apparatus or a speaker. The microphone 372 may use various noise removal algorithms to remove noise generated while receiving the external acoustic signal.

The storage unit 380 may store programs for processing and controlling of the processor 330 and may store input/output data (e.g., an application, content, time slot information of an external device, an address book, etc.).

The storage unit 380 may include at least one type of storage medium from among a flash memory type memory, a hard disk type memory, a multimedia card micro type memory, a card type memory (e.g., a secure digital (SD) or extreme digital (XD) memory, etc.), random access memory (RAM), static RAM (SRAM), read-only memory (ROM), electrically erasable programmable ROM (EEPROM), programmable ROM (PROM), a magnetic memory, a magnetic disc, and an optical disc. In addition, the electronic apparatus 300 may run a web storage that performs a storing function of the storage unit 380 on the Internet or a cloud server.

The programs stored in the storage unit 380 may be classified into a plurality of modules according to functions thereof, e.g., a user interface (UI) module 381, a touchscreen module 382, and a notification module 383.

The UI module 381 may provide a specialized UI or graphical UI (GUI) interworking with the electronic apparatus 300 for each application. The touchscreen module 382 may sense a touch gesture of a user on a touchscreen and may transmit information regarding the touch gesture to the processor 330.

The touchscreen module 382 may recognize and analyze a touch code. The touchscreen module 382 may be configured as separate hardware including a controller.

The notification module 383 may generate a signal for providing notification of the occurrence of an event in the electronic apparatus 300. Examples of the event occurring in the electronic apparatus 300 may include call signal reception, message reception, key signal input, and schedule notification. The notification module 383 may output a notification signal in the form of a video signal through the display 351, may output a notification signal in the form of an audio signal through the sound output interface 352, and may output a notification signal in the form of a vibration signal through the vibration motor 353.

Each of the block diagrams of the electronic apparatuses 100 and 300 shown in FIGS. 10 and 14 is a block diagram for an embodiment of the present invention. Components shown in the block diagrams may be integrated, added, or omitted according to actually implemented specification of the electronic apparatuses 100 and 300. Two or more components may be combined into one component as necessary, or one component may be divided into two or more components. In addition, a function that is performed in each block is for describing embodiments, and a detailed operation or apparatus thereof does not limit the scope of claims.

At least a portion of an apparatus (e.g., modules or functions thereof) or a method (e.g., operations) may be implemented as a command stored in a non-transitory computer-readable recording medium in the form of a program module. When the command is executed by a processor (e.g., the processor 330), the processor may perform a function corresponding to the command.

The program described herein may be stored in a non-transitory computer-readable recording medium and be read and executed by a computer to implement one or more embodiments of the present disclosure.

The non-transitory readable recording medium described herein not only refers to a medium configured to semi-permanently store data and readable by a device but also includes a register, a cache, a buffer, etc., and does not include a medium of transmission such as a signal or current.

The programs described above may be stored in the non-transitory readable recording medium such as compact disc (CD), digital versatile disc (DVD), a hard disk, a Blu-ray disk, universal serial bus (USB), an embedded memory (e.g., the memory 130), a memory card, ROM, or RAM and be provided.

In addition, the methods according to the disclosed embodiments may be provided as a computer program product. The computer program product may include a software (S/W) program, a computer-readable storage medium in which the S/W program is stored, or a product traded between a seller and a purchaser.

For example, the computer program product may include an electronic apparatus or a product (e.g., a downloadable application) in the form of a S/W program electronically distributed through a manufacturer of the electronic apparatus or an electronic market (e.g., Google Play™ Store or App Store™). For the electronic distribution, at least a portion of the S/W program may be stored in a storage medium or may be temporarily generated. In this case, the storage medium may be a storage medium of a server in the manufacturer or the electronic market or a relay server.

According to one or more embodiments of the present disclosure, an electronic apparatus may recognize a user by extracting, even when the electronic apparatus obtains a user image where a face region not detected, appearance information or behavior information of the user from the user image. Accordingly, restrictions on a location or a direction where a camera that obtains the user image is installed appear.

According to one or more embodiments of the present disclosure, an electronic apparatus may improve a user's convenience of use by automatically determining whether to make an update and updating a user recognition model by using collected appearance information or behavior information of the user.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a memory configured to store one or more instructions; and
a processor configured to execute the one or more instructions stored in the memory,
wherein the processor is further configured to, by executing the one or more instructions:
obtain a first user image of a user,
recognize the user from a face region of the first user image by using a first recognition model learned based on face information of a plurality of users,
extract a first additional feature information regarding the recognized user from the first user image,
obtain a second recognition model by allowing the first recognition model to additionally learn based on the extracted first additional feature information,
obtain a second user image of the user, and
recognize the user from a person region of the second user image by using the second recognition model.

2. The electronic apparatus of claim 1,
wherein the first additional feature information regarding the user comprises at least one of appearance information or behavior information of the user, and
wherein the processor is further configured to, by executing the one or more instructions, detect the person region of the user from the first user image and extract the at least one of the appearance information or the behavior information of the user from the person region.

3. The electronic apparatus of claim 1,
wherein the first recognition model is configured to recognize the user based on face information extracted from the first user image, and
wherein the second recognition model is configured to recognize the user based on at least one of face information, appearance information, or behavior information extracted from the second user image.

4. The electronic apparatus of claim 3, wherein the second recognition model is further configured to:
recognize, when the face region is not detected in the second user image, the user by using at least one of the behavior information or the appearance information extracted from the person region, and
recognize, when the face region is detected in the second user image, the user by using the face information extracted from the face region.

5. The electronic apparatus of claim 1, wherein the processor is further configured to, by executing the one or more instructions:
evaluate a recognition result of the second recognition model, and
update the second recognition model according to a result of the evaluation.

6. The electronic apparatus of claim 5, wherein the processor is further configured to, by executing the one or more instructions, evaluate the recognition result of the second recognition model by comparing a result of recognizing the user by using a second additional feature information extracted from the second user image and a result of recognizing the user by using the face information extracted from the second user image.

7. The electronic apparatus of claim 6, wherein the processor is further configured to, by executing the one or more instructions:
extract the second additional feature information of the user from the second user image, and
update the second recognition model by allowing the second recognition model to additionally learn based on the second additional feature information.

8. The electronic apparatus of claim 7, wherein the processor is further configured to, by executing the one or more instructions, update the second recognition model by allowing the second recognition model to additionally learn in real time based on the second additional feature information.

9. The electronic apparatus of claim 7, wherein the processor is further configured to, by executing the one or more instructions:
store the second additional feature information, and
periodically, when the electronic apparatus is in a preset state, or when a request made by the user is input, update the second recognition model by allowing the second recognition model to additionally learn.

10. The electronic apparatus of claim 1, further comprising a display configured to display information regarding the recognized user by using the second recognition model.

11. The electronic apparatus of claim 1, wherein the first recognition model is received from an external server.

12. An operation method of an electronic apparatus, the operation method comprising:
obtaining a first user image of a user;
recognizing the user from a face region of the first user image by using a first recognition model learned based on face information of a plurality of users;
extracting a first additional feature information regarding the recognized user from the first user image;
obtaining a second recognition model by allowing the first recognition model to additionally learn based on the extracted first additional feature information of the user;
obtaining a second user image of the user; and
recognizing the user from a person region of the second user image by using the second recognition model.

13. The operation method of claim 12,
wherein the first additional feature information regarding the user comprises at least one of appearance information or behavior information of the user, and
wherein the extracting of the first additional feature information regarding the recognized user from the first user image comprises detecting the person region of the user from the first user image and extracting the at least one of appearance information or behavior information of the user from the person region.

14. The operation method of claim 12,
wherein the recognizing of the user by using the first recognition model comprises recognizing the user based on face information extracted from the first user image, and
wherein the recognizing of the user by using the second recognition model comprises recognizing the user based on at least one of face information, appearance information, or behavior information extracted from the second user image.

15. The operation method of claim 14, wherein the recognizing of the user by using the second recognition model further comprises:
recognizing, when the face region is not detected in the second user image, the user by using at least one of the behavior information or the appearance information extracted from the person region, and
recognizing, when the face region is detected in the second user image, the user by using the face information extracted from the face region.

16. The operation method of claim 12, further comprising:
evaluating a recognition result of the second recognition model; and
updating the second recognition model according to a result of the evaluating.

17. The operation method of claim 16, wherein the evaluating of the recognition result of the second recognition model comprises evaluating the recognition result of the second recognition model by comparing a result of recognizing the user by using a second additional feature information extracted from the second user image and a result of recognizing the user by using the face information extracted from the second user image.

18. The operation method of claim 17, further comprising:
extracting the second additional feature information of the user from the second user image, and updating the second recognition model by allowing the second recognition model to additionally learn based on the second additional feature information.

19. The operation method of claim 18, further comprising:
storing the second additional feature information,
wherein the allowing of the second recognition model to additionally learn and the updating of the second recognition model comprises allowing the second recognition model to additionally learn and updating the second recognition model periodically, when the electronic apparatus is in a preset state, or when a request made by the user is input.

20. The operation method of claim 12, the method further comprising displaying information regarding the recognized user by using the second recognition model.

21. A non-transitory computer-readable recording medium having recorded thereon a program for executing the method of claim 12 on a computer.

* * * * *